(12) United States Patent
Masotti et al.

(10) Patent No.: US 7,815,573 B2
(45) Date of Patent: Oct. 19, 2010

(54) METHOD AND DEVICE FOR SPECTRAL ANALYSIS OF AN ECHOGRAPHIC SIGNAL

(75) Inventors: Leonardo Masotti, Florence (IT); Elena Biagi, Florence (IT); Simona Granchi, Arezzo (IT); Luca Breschi, Prato (IT)

(73) Assignees: Actis Active Sensors S.r.l., Firenze (IT); Esaote S.p.A., Alessandria (IT)

( * ) Notice: Subject to any disclaimer, the term of this patent is extended or adjusted under 35 U.S.C. 154(b) by 1996 days.

(21) Appl. No.: 10/383,674

(22) Filed: Feb. 25, 2003

(65) Prior Publication Data

US 2003/0167003 A1    Sep. 4, 2003

(30) Foreign Application Priority Data

Feb. 27, 2002    (IT)    .............................. FI2002A0034

(51) Int. Cl.
*A61B 8/00*    (2006.01)
(52) U.S. Cl. .................. 600/443; 600/407; 600/437; 600/442; 382/128; 382/130; 382/132; 73/602
(58) Field of Classification Search ................. 600/407, 600/437, 442, 443; 382/128, 132; 73/602
See application file for complete search history.

(56) References Cited

U.S. PATENT DOCUMENTS 5,526,816 A * 6/1996 Arditi ......................... 600/458

6,066,098 A * 5/2000 Masotti et al. .............. 600/443
6,123,719 A * 9/2000 Masychev .................... 600/407
2006/0277998 A1* 12/2006 Masotti ........................ 73/579

OTHER PUBLICATIONS

E.J. Feleppa, Jul. 1996, *Typing of Prostate Tissue by Ultrasonic Spectrum Analysis*, IEEE Transactions of Ultrasonics, Ferroelectrics, and Frequency Control, vol. 43, No. 4.
E.J. Feleppa et al., 1986, *Diagnostic Spectrum Analysis in Ophthalmology: A Physical Perspective*, Ultrasound in Med. & Biol. vol. 12, No. 8, pp. 623-631.
Georg Schmitz, Jan. 1999, *Tissue-Characterization of the Prostate Using Radio Frequency Ultrasonic Signals*, IEEE Transactions on Ultrasonics, Ferroelectrics, and Frequency Control, vol. 46, No. 1.
F.L. Lizzi, Aug. 1997, *Ultrasonic Scatterer-Property Images of the Eye and Prostate*, 1997 IEEE Ultrasonics Symposium—1109.

(Continued)

*Primary Examiner*—Brian Casler
*Assistant Examiner*—Baisakhi Roy
(74) *Attorney, Agent, or Firm*—McGlew and Tuttle, P.C.

(57) ABSTRACT

A description is given of a method of spectral analysis of a radio frequency ultrasonic signal reflected by a structure subjected to echographic examination, comprising the steps of: a) transmitting an ultrasonic excitation signal into a portion of said structure under examination; b) receiving a radio frequency response signal from said structure; c) applying a time-frequency transform to said radio frequency response signal, dividing the radio frequency response signal into a plurality of frequency bands; d) calculating a local spectral parameter from the values of the time-frequency transform.

22 Claims, 23 Drawing Sheets

OTHER PUBLICATIONS

E.J. Feleppa et al., Jun. 1995, *3-D Tissue Typing of Prostate Tissue Based on Spectral Parameters, 1995 IEEE Ultrasonics Symposium—1171.*

G. Schmitz et al., 1994, *Tissue Characterization of the Prostate Using Kohonen-Maps, 1994 Ultrasonics Symposium—1487.*

A.L. Huynen, et al., 1994, *Analysis of Ultrasonographic Prostate Images for the Detection of Prostatic Carcinoma: The Automated Urologic Diagnostic Expert System, Ultrasound in Med. & Biol.*, vol. 20, No. 1, pp. 1-10.

L. Masotti, E. Biagi, M. Calzolai, L. Capineri, S. Granchi, M. Scabia, 1999, *FEMMINA: a Fast Echographic Multiparametric Multi Imaging Novel Apparatus, IEEE Ultrasonics Symposium.*

Gabriella Concotti, 2001, *Frequency Decomposition and Compounding of Ultrasound Medical Images With Wavelet Packets, IEEE Transactions on Medical Imaging.*

Kunio Suzuki et al, Cepstral analysis of ultrasound in chronic liver disease—a preliminary study in the non-invasive evaluation of structural change, "Frontiers Med. Biol. Engang." vol. 3, No. 4, pp. 269-281 (1991).

* cited by examiner (A)
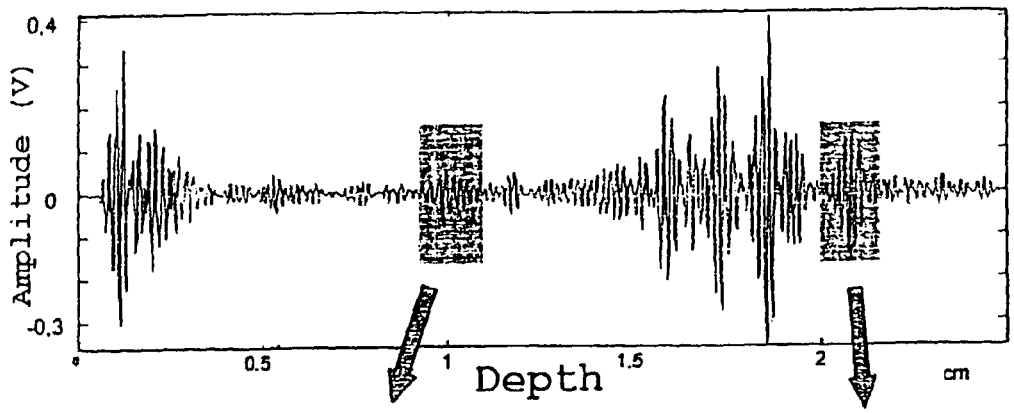
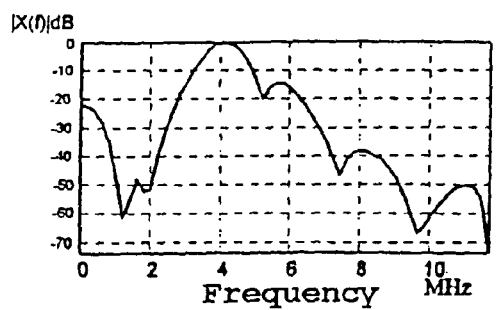
(B)
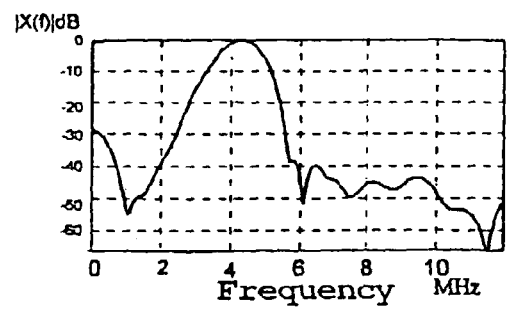
(C)
Fig. 4

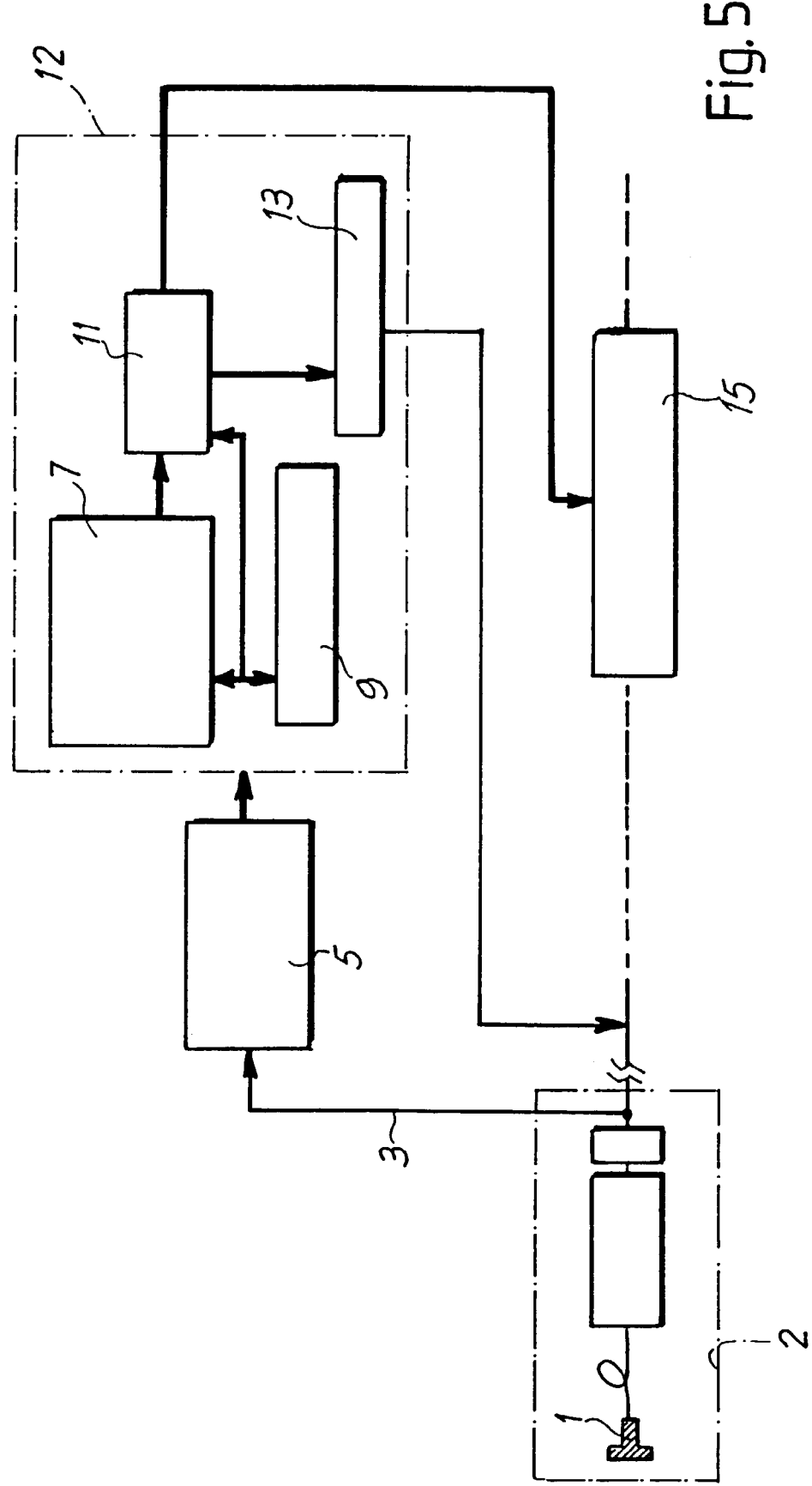

(track 1)

INPUT
FRAME
(RF signal)

(track n)

(time, depth)

(track 1)

DIGITIZED
FRAME (sampled and
digitized signal)

(track n)

(time, depth)

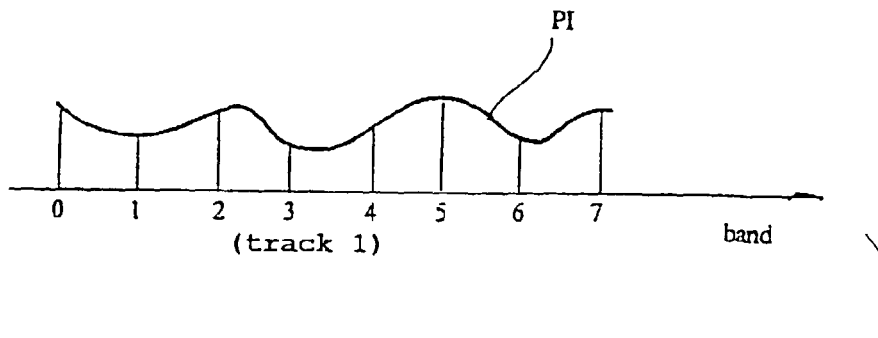
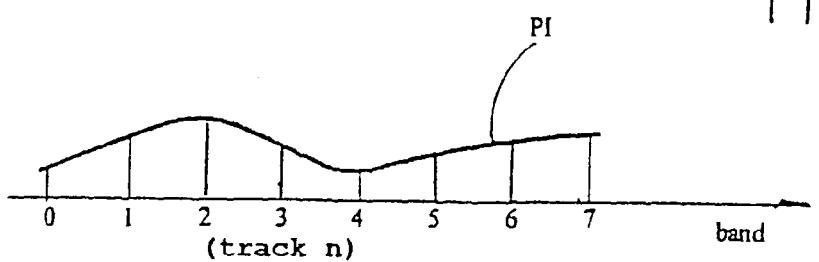
Fig. 7E
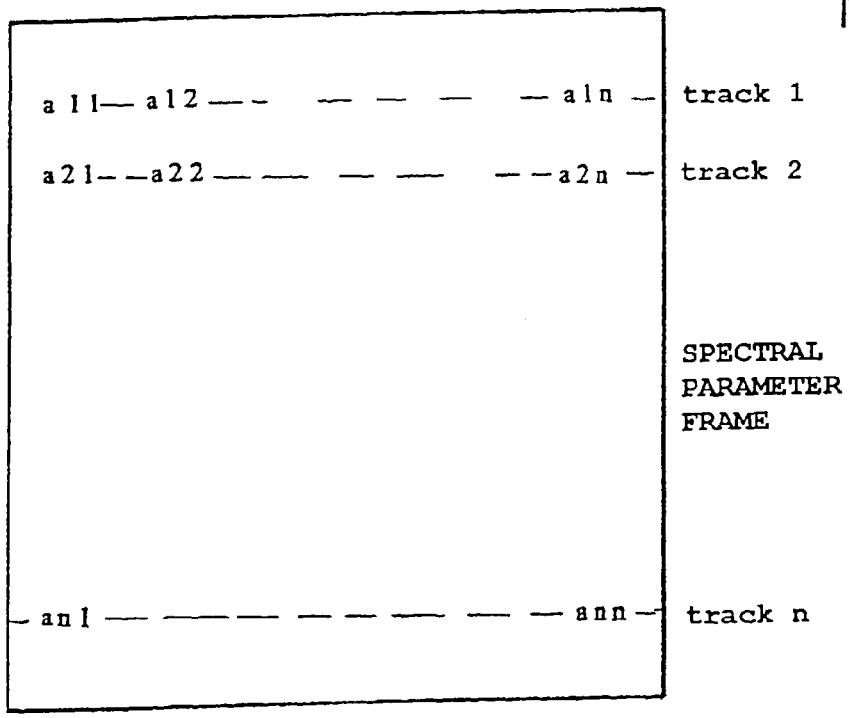
Fig. 7F $E_i(z)$ is the equivalent filter for the WP coefficients at the output of the i-th stage

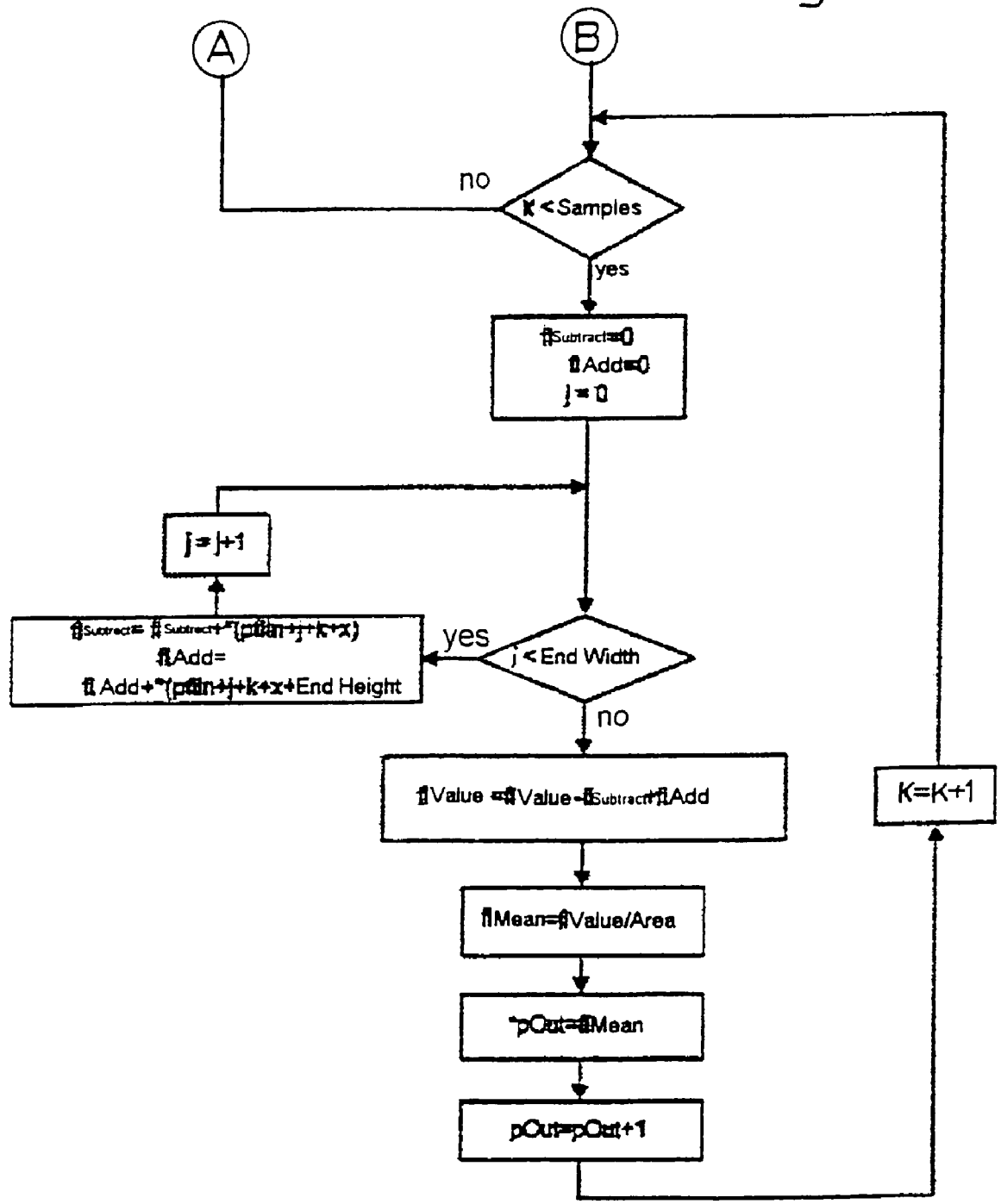
Fig. 22 (II)

METHOD AND DEVICE FOR SPECTRAL ANALYSIS OF AN ECHOGRAPHIC SIGNAL

TECHNICAL FIELD

The present invention relates to a method for processing echographic signals, particularly in the field of non-invasive clinical examination based on the ultrasonic method. The invention also relates to an ultrasonic device for applying a method for processing echographic signals.

PRIOR ART

Echography is a non-invasive method of investigation for examining internal organs of the human and animal body, and also for the non-invasive examination of other types of structures, including non-living and inorganic structures. As is known, it is based on the generation of a set of ultrasonic signals (forming an acoustic beam) which are directed into the patient's body and which excite an ultrasonic response signal, caused by back reflection and/or diffusion of sound waves by the diffusers and/or reflectors present within the region under observation. The probe for transmitting and receiving the echographic signal sends the response signal to a receiving and processing system, after which the signal is converted into a two-dimensional ultrasonic image.

Commercial ultrasonic scanners supply images relating to the amplitude of the echographic signal back-propagated by the various tissues or interfaces struck by the acoustic beam.

The various tissues or the various interfaces encountered are detected on the basis of their echogenicity, determined by their acoustic impedance which in turn is the product of the density and the acoustic velocity.

The purpose of conventional ultrasonic scans is to reconstruct and maintain the spatial ordering of the tissue under examination, by making use of amplitudes determined in the time domain, which in turn yields the spatial location in depth. The signal treatment which is carried out has the aim of maximizing the signal to noise ratio and holding the sensitivity of the examination constant while the depth varies.

When the acoustic wave is propagated in a medium and encounters a non-homogeneous region, some of the energy is back-propagated towards the transducer and some is propagated into the tissue.

The back-propagated acoustic signal consists of the temporal superimposition of the contributions from each reflector and/or diffuser; the result is a signal having an extremely complex shape, due to the random nature of the distribution and the shapes and mechanical properties of the diffusers and the reflectors. The acoustic signal back-propagated by the medium under examination is converted by the transducer into an electrical signal, called the radio frequency signal.

FIG. 1 shows a portion of a radio frequency signal forming part of an ultrasonic trace relating to biological tissue. More particularly, FIG. 1 shows a portion of a track of the return echographic signal from a portion of an organ subjected to echographic examination. The horizontal axis shows the response time, in other words the depth of the location of the diffuser or reflector which generates the return signal captured by the transducer. The vertical axis shows the amplitude of the signal. The ultrasonic image of the organ under examination is reconstructed from a set of tracks of this type, which form a frame of signals.

A first very simple processing operation carried out on the radio frequency signal is the extraction of the signal amplitude by means of an envelope extraction operation. In FIG. 2, the letter I indicates the result of the envelope operation carried out on the radio frequency signal shown in FIG. 1. It will be noted that the envelope signal follows the positive crests of the radio frequency signal and therefore provides an estimate of the signal amplitude.

The envelope operation is currently used in all ultrasonic imaging techniques and forms the basis of the A-mode presentation of the individual trace (where A stands for amplitude) and B-mode presentation (where B stands for brightness) for the resulting images, each individual A-mode trace being encoded on a gray or color scale.

In ultrasonic scans of the present generation, the envelope of the echographic signal is used, in other words the detected signal is sent to the A-mode, B-mode and M-mode traces.

With this solution, there is a loss of the information contained in the radio frequency signal, in other words the information in the form generated by the receiving transducer, consisting of a signal having a carrier frequency approximately equal to that of the center frequency of the band of said receiving transducer, with a frequency modulation (asymmetric spectrum) with phase steps (frequency peaks) and possibly with a morphology due to non-linear distortion when the medium shows non-linear effects (generation of harmonic spectra).

FIG. 3 shows the envelope signal of the radio frequency trace of FIG. 1, in a conventional A-mode representation. It will be noted that information on the frequency and phase of the original signal has been lost irretrievably.

In particular, if the radio frequency is eliminated by an envelope extraction operation, there is a loss of:

information obtained from non-linear interactions between ultrasound and biological tissues (local acoustic impedance which depends on the density of the medium, which in turn depends on the intensity of the incident ultrasonic wave, re-emission on the harmonics and subharmonics by bubbles present in the contrast medium, etc.)

information obtained from linear interactions, namely the modifications of the signal spectrum due to selective absorption, especially where this is depth-dependent, and the scalloping effect (indentation of the shape of the amplitude spectrum present in signals which have been backscattered by discontinuities, including those of the point type, distributed periodically in space)

The conventional echography systems used for medical diagnosis are therefore based on the observation of an A-mode trace or a B-mode image, which show only the amplitudes of the echo signal relating to the various tissue structures encountered.

Consequently there are situations in which the conventional methods are found to be limited since, owing to low sensitivity or low specificity, it is not possible to obtain a reliable diagnosis of pathology. However, a radio frequency signal contains not only the information relating to amplitude, but also the frequency and phase information (related to the time delays with which the echoes due to individual diffusers reach the transducer).

The latest signal processing methods tend to extract all the parameters characterizing the signal, and in particular what is known as the spectral content. Spectral analysis applied directly to the radio frequency signal can extract information from all the characteristics of the echo signal as it is returned from the transducer.

A spectral analysis algorithm for "reading" the signal in the frequency domain makes it possible to provide characteristic values for the differentiation of the various types of signal and consequently of the biological structures with which they interact.

Diagram (A) in FIG. 4 again shows the radio frequency signal of FIG. 1, while diagrams (B) and (C) show the spectral content of the signal for two portions of the trace of FIG. 4A, to show how the structural differences in the tissues result in different types of ultrasonic impulses and consequently distinctive frequency variations in the corresponding characteristics. The spectral contents of the two portions of signal shown in FIGS. 4B and 4C extend from 0 to 12 MHz. It should be noted that both spectra have approximately the same central frequency (the frequency at which the peak is found) in the vicinity of 4 MHz (the signal relates to scanning with an ultrasonic probe having a nominal frequency of 5 MHz), but have different frequency variations, since the first graph shows contributions (above 5 MHz) which are present to a lesser extent in the other portion of the signal.

The above facts demonstrate that spectral analysis of the radio frequency signal is a powerful tool for characterizing tissues by means of the corresponding ultrasonic signal.

Recently, the development of new signal processing algorithms has made it possible to obtain further information on tissues, the trend being to investigate the interaction with the ultrasonic beam in terms of spectral variations induced in the reflected signal. In fact, it has been found that pathological structures can be identified according to the differences in their selective frequency filtering action.

Examples of attempts to type tissues by spectral analysis of ultrasonic signals are described in E. J. Feleppa et al, *Typing of Prostate Tissue by Utrasonic Spectrum Analysis*, in IEEE Transactions of Ultrasonics, Ferroelectrics and Frequency Control, Vol. 43) no. 4, July 1996, p. 609 ff.; E. J. Feleppa et al., *Diagnostic Spectrum Analysis in Ophthalmology: A Physical Perspective*, in Ultrasound in Med. & Biol. Vol. 12, no. 8, 1986, p. 623 ff.; G. Schmitz, et al., *Tissue-Characterization of the Prostate Using Radio Frequency Ultrasonic Signals*, in IEE Transactions on Ultrasonics, Ferroelectrics and Frequency Control, Vol. 46, no. 1, January 1999, p. 126 ff.; F. L. Lizzi, *Utrasonic Scatterer-Property Images of the Eye and Prostate*, in 1997 IEEE Ultrasonics Symposium, p. 1109 ff.; E. J. Feleppa et al, *3-D Tissue Typing of Prostate Tissue Based on Spectral Parameters*, in 1995 Ultrasonics Symposium, p. 1171 ff.; G. Schmitz et al, *Tissue Characterization of the Prostate Using Kohonen-Maps*, in 1994 Ultrasonics Symposium, p. 1487 ff.; A. L. Huynen et al., *Analysis of Ultrasonographic Prostate Images for the Detection of Prostatic Carcinoma: The automated Urologic Diagnostic Expert System*, in Ultrasound in Med. & Biol., Vol. 20, no. 1, 1994, p. 1 ff.

However, the methods developed up to the present time have not proved to be effective, either because they are unsuitable for typing tissue in a reliable way, or because of the excessive computing capacity required for the algorithms used, which cannot be implemented in a way that permits the real time display of the results, which would make it possible to envisage clinical applications where the speed of data output is a basic requirement.

OBJECTS AND BRIEF DESCRIPTION OF THE INVENTION

The object of the present invention is to provide an effective and reliable method for typing a tissue by the spectral analysis of an echographic signal. More generally, the object of the present invention is to provide a method for characterizing a generic structure which may be an organ of a human or animal body, but which may also be an inanimate composite structure. This is because the method according to the present invention can be applied both to ultrasonic analysis in medicine and diagnosis and to more purely technological fields, for carrying out non-invasive examinations to determine the characteristics of a structure, for example in order to check its internal integrity. In the present description and in the attached claims, therefore, the term "structure under examination" denotes, in a general way, either a tissue or a living organ, or an inanimate structure.

This and further objects and advantages, which the following text will make clear to those skilled in the art, are achieved essentially by means of a method of spectral analysis of an ultrasonic signal returned by a structure subjected to echographic examination, comprising the steps of:

a) transmitting an ultrasonic excitation signal into a portion of said structure subjected to examination;

b) receiving a response signal from said structure;

c) applying a time-frequency transform to said response signal, thus dividing the response signal into a plurality of frequency bands;

d) calculating a local spectral parameter from the values of the time-frequency transform, by statistical investigation of the values of the time-frequency transform.

The time-frequency transform is an essential requirement for the local extraction of the information contained in the frame of the back-propagated echographic signal.

The method of the present invention is essentially based on the determination, for a number of samples of the input frame, of a parameter which takes into account the variations in the characteristics of the signal spectrum. The values of this parameter are arranged in a frame which, in a subsequent display stage, generates a color scale, which can be superimposed on the B-mode image of the ultrasonic scan, and which provides an indication of the variation of the spectral characteristics of the signal. Since it has been found that pathological tissue structures, for example tumor cells, cause an alteration of the spectral characteristics of the ultrasonic return signal, this is reflected in an alteration of the value of the local spectral parameter. An indication of the location of any neoplasms of the examined organ can be obtained and superimposed on the conventional B-mode image, by using a color scale to display the areas of the image in which the spectral parameter statistically takes values lying within a reference class which, experimentally, can be associated with neoplastic phenomena.

The invention, which is based on the considerations stated above regarding the loss of information due to the operation of extracting the envelope of the radio frequency signal, essentially makes it possible to detect the local information for the structure under examination by the extraction of the local spectrum either within a small time slot, or within a small range of distances around each point of the echogram.

In practice, the method is based on the principle of characterizing the echographic signal by decomposing it into frequency bands by means of a time-frequency transform, using a suitable decomposition algorithm, and proceeding to analyze the variation of the coefficients of the time-frequency transform at each instant of time in the various frequency bands.

Theoretically, it is possible to use any time-frequency transform which can encode the suitably sampled and digitized echographic signal into bands or sub-bands. The frequency band encoding makes it possible to identify the variation of the coefficients in the various bands, and thus essentially to identify the frequency variations of the signal for individual instants of time. The local spectral parameter is extracted from these variations. This operation can be carried out by using the convolution of the backscattered signal with a special waveform (wavelet) which has a morphology similar to that of the transmitted signal, but has a continuously variable carrier frequency, on the signal whose spectrum is to be determined.

The point spectrum which is obtained has a morphology which depends on the linear and non-linear interaction effects mentioned above; these effects are due to the mechanical characteristics and microstructural organization (in the dimensional scale around the values of the wavelength of the interacting ultrasounds) of the small elementary volume (point) in question. For faster calculation, the discrete form of wavelet transform is preferably used. It has also been found that appreciable results are obtained by using the discrete wavelet packet transform.

The variation of the local spectrum is approximated by a polynomial function whose coefficients are organized in classes of values.

The classes are made significant by examining the values of the coefficients derived from spatial means in intervals along the line of sight around the point in question and on corresponding portions of a certain number of lines of sight adjacent to both sides of the line of sight on which the point in question is located.

This is because the decomposition algorithm based on the discrete wavelet packet transform (DWPT) makes it possible to have high frequency resolutions in each region of the signal band, and also to analyze the time-frequency plane with a different resolution. For example, after fixing the frequency region in which higher resolution is desired, the corresponding sequence of coefficients is decomposed at a higher level, while the others can be decomposed at a lower level, with advantages in terms of temporal resolution.

In a practical embodiment of the invention, the local spectral parameter is calculated on the basis of a frame of the energy content of the signal, found for each band into which the digitized signal has been sampled.

In practice, the method according to the present invention can comprise the steps of:
  acquiring an input frame, consisting of a plurality of tracks, each track consisting of the radio frequency signal received from the transducer after the generation of an excitation pulse;
  sampling and digitizing each track of said frame, thus generating a digitized frame consisting of a plurality of tracks, each containing a set of digitized samples;
  applying said time-frequency transform to the digitized frame, thus encoding said digitized frame into a plurality of frequency bands, generating one frame of the transform in each band,
  calculating the energy content of the signal for each track of the frame of the transform in each band, thus defining an intermediate energy content frame, said energy content frame having a set of samples representing the energy content of the input signal for each track and in each band;
  interpolating for each track of the energy content frame, with an interpolating polynomial above the second degree, the samples of all the bands for each instant of time, one of the coefficients of said interpolating polynomial representing said local spectral parameter, and generating a frame of the spectral parameters containing the values of said coefficient for each coefficient of the energy content frame.

More generally, the method can include encoding the digitized signal into frequency bands, and consequently:
  selecting at least two frequency bands into which said response signal has been divided;
  extracting a local spectral parameter from the coefficients of said at least two frequency bands.

Essentially, the method according to the present invention is based on the concept of decomposing the signal into frequency bands and then extracting, from the variation of the coefficients in the individual bands, local statistical information related to the characteristics of the tissues or more generally of the structure which has generated the echography response signal. In practice, the following steps may be provided:
  acquiring an input frame, consisting of a plurality of tracks, each track consisting of the response signal corresponding to an excitation signal;
  sampling and digitizing each track of said frame, thus generating a digitized frame consisting of a plurality of tracks, each containing a set of digitized samples;
  applying said time-frequency transform to the digitized frame, thus encoding said digitized frame into a plurality of frequency bands, generating one frame of the transform in each band;
  generating from the coefficients of at least two of said frames of the transform a frame of local spectral parameters, in which each coefficient is obtained by processing the coefficients of said at least two frames of the transform.

The local spectral parameters can be found by various forms of processing, according to the type of local information which is to be extracted from the signal encoded into frequency bands. For example, it is possible to determine a spectral parameter related to the variation of the phase of the back-propagated signal.

Alternatively, it is possible to move a window over each of the two frames of the transform, and to determine, for each step, the maximum value taken by the coefficients in said window. The maximum values extracted for each step in the two frames of the transform can then be combined with each other to obtain the frame of the local spectral parameters. Each frame can then be subjected to statistical investigation, for example in order to determine the population, in other words the statistical distribution of the parameters in one or more reference classes.

By determining the maximum values taken by the coefficients for each position of the window as it moves over the frames of the transform, an intermediate frame is obtained for each frame of the transform.

When the processing which is carried out is based on the energy content of the signal, the intermediate frame is represented, for each frame of the transform, by the corresponding energy content frame.

Further advantageous characteristics and embodiments of the method according to the invention are indicated in the attached claims and are described in greater detail below with reference to a practical embodiment of the method.

The invention also relates to an echography device comprising an echography probe and means of acquiring and processing a return signal from an organ subjected to echographic examination, characterized in that said acquisition and processing means are programmed to implement a method as specified above.

BRIEF DESCRIPTION OF THE DRAWINGS

The invention will be more clearly understood from the description and the attached drawing, which shows a practical and non-restrictive embodiment of the invention. More particularly, FIGS. 1 to 4, described above, show an echography trace and a representation of the spectral content in two portions of said trace;

FIG. 5 shows a simplified block diagram of an echographic apparatus;

FIGS. 7A-7G show schematically the sequence of processes carried out on the echographic signal by the method according to the present invention;

DETAILED DESCRIPTION OF THE PREFERRED EMBODIMENT OF THE INVENTION

General Description of the Apparatus

Figure 1:
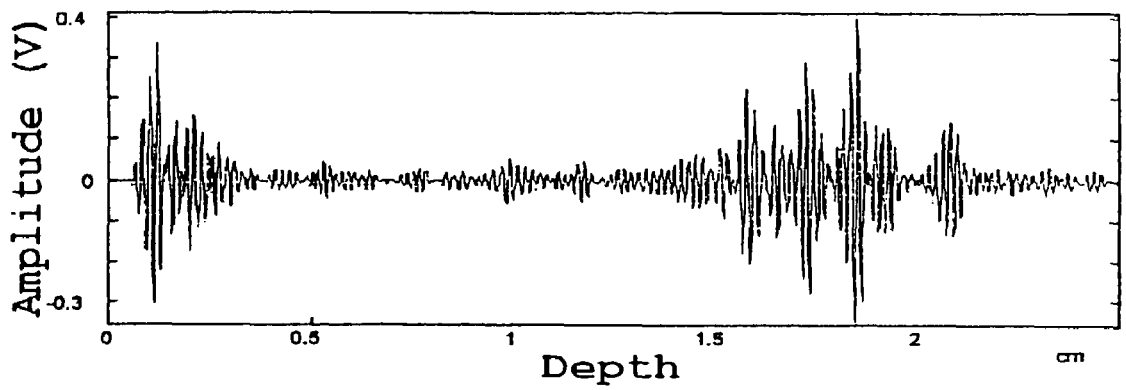
Figure 2:
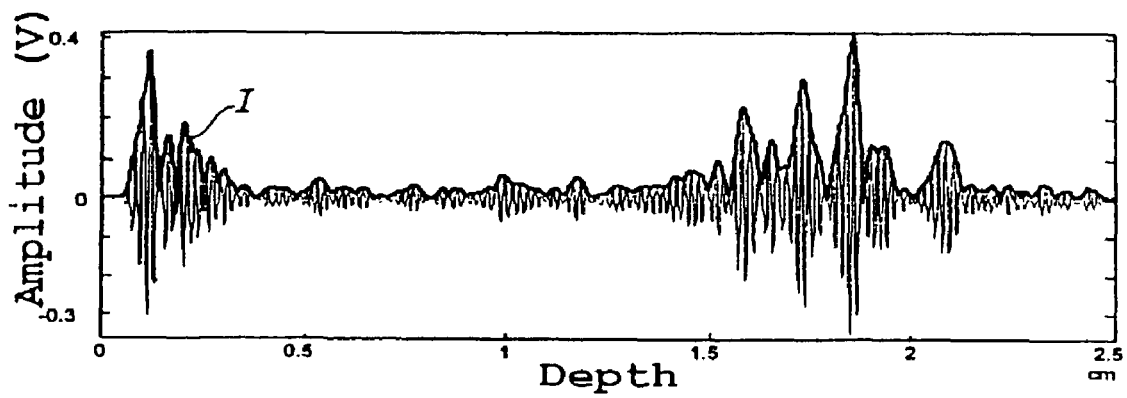
Figure 3:
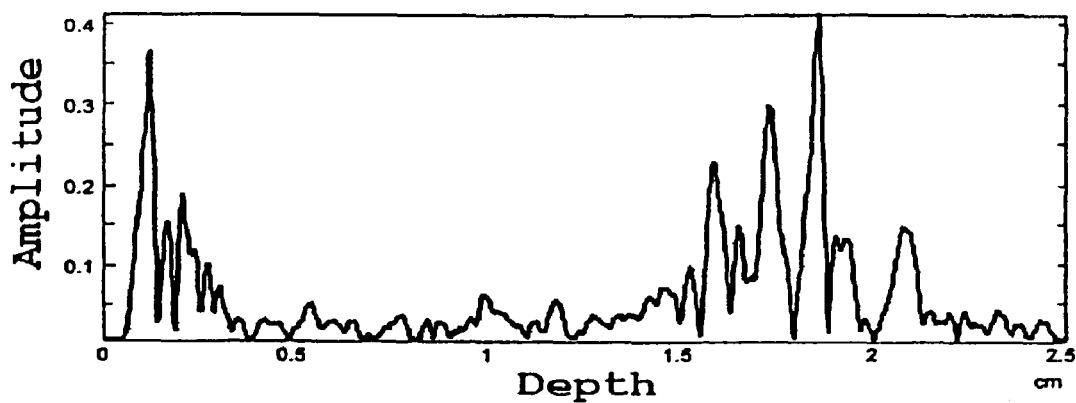

FIG. 5 shows a highly schematic block diagram of an echographic apparatus. The number 1 indicates a transducer of the scanning head, indicated in a general way by 2, which emits the echographic excitation signal and receives the echographic response signal. The analog output 3 of the scanning head is connected to an acquisition card 5. This generates a sampled and digitized radio frequency signal, which forms the input for a bank of integrated FIR filters, indicated in a general way by 7. The bank of filters 7 can consist of any commercially available integrated device, for example the 43168 circuit produced by Harris, the GF 191 circuit produced by Gennum, the GEC 16256 circuit produced by Plessey, or the GC2011 circuit produced by Graychip. The FIR filter 7 is associated with a digital signal processor (DSP) indicated by 9, which acts as a controller for the whole processing unit. The microcontroller 9 can be, for example, a TMS 32031 DSP made by Texas (USA) or other equivalent.

The number 11 indicates a store associated with the filter 7 and with the controller 9. The store 11 is connected to an analog/digital converter 13 and to the digital stages of the scanning head 2.

Figure 6A:
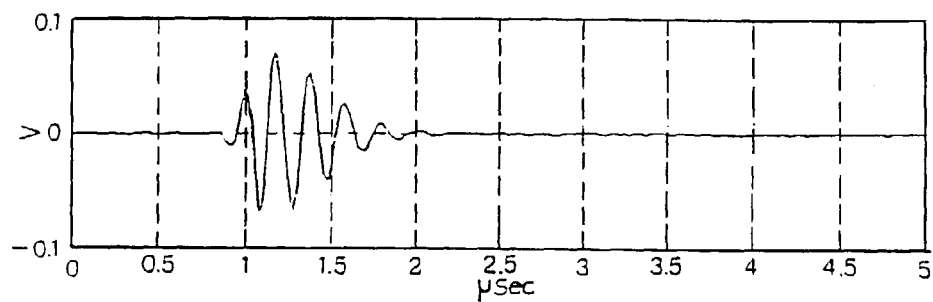
FIG. 6A shows an echographic excitation signal sent by the transducer into the organ to be examined.

The circuit described here is known and does not require more detailed description. Essentially, the apparatus operates as follows. The transducer 1 emits a series of echographic excitation signals having, for example, the form shown in FIG. 6A, into the body containing the organ to be examined, for example the prostate, the liver or other part. The tissue struck by the ultrasonic waves of the signal emitted by the transducer 1 returns a scattered or reflected signal which has the form of the signal in FIG. 1 (radio frequency signal).

The radio frequency signal is taken from the receiving circuit of the echograph immediately after the time gain compensation (TGC) unit and is then digitized at a suitable sampling frequency, for example 40 MHz, and with a resolution of 12 bits (or other suitable resolution), by the acquisition card 5. In practice, acquisition is carried out for individual tracks until a frame or a portion of a frame is complete. The signal samples acquired for each individual track are stored in a memory bank of the acquisition card until a complete frame or a portion of a frame has been acquired; it is only at this point that the stored data are sent to the processor card comprising the DSP 9 and the FIR filter 7 which execute the operations which are described in detail below, according to the method of the present invention. While the data is being transferred to the processor card, the acquisition card starts to acquire the signal samples of the tracks for the next frame. The processing time of the processor card 12 is short enough to allow the processing to be completed within the acquisition time of the sampled signal for the next frame. Thus real time operation is achieved.

The processor card 12 carries out the processing of the signal, particularly the time-frequency transform using the integrated filters 7 and the other operations which are described in greater detail below, to obtain the characterization of the signal spectrum.

Brief Description of the Signal Processing Procedure

FIGS. 7A-7E and 8 summarize, in the form of graphs and a summary flow chart, the operations carried out on the input signal to obtain the representation of the frame containing the information on the local spectral parameter determined by the method according to the present invention.

The processing of the sampled and digitized signal acquired by the card 5 commences with the application of a time-frequency transform to encode the signal into sub-bands. Essentially, for each track of the acquired, sampled and digitized frame, the signal is decomposed into a series of frequency bands or sub-bands by the application of a wavelet transform, and in particular by means of the discrete wavelet packet decomposition. The filtering is performed by the bank of integrated filters 7. The number of bands or sub-bands into which the digitized signal is decomposed depends on the number of consecutive filtering operations used. In practice, a decoding into eight bands or sub-bands, indicated below as band 0, band 1, ... band 7, is sufficient for the purposes of the method according to the present invention.

Figure 7A:
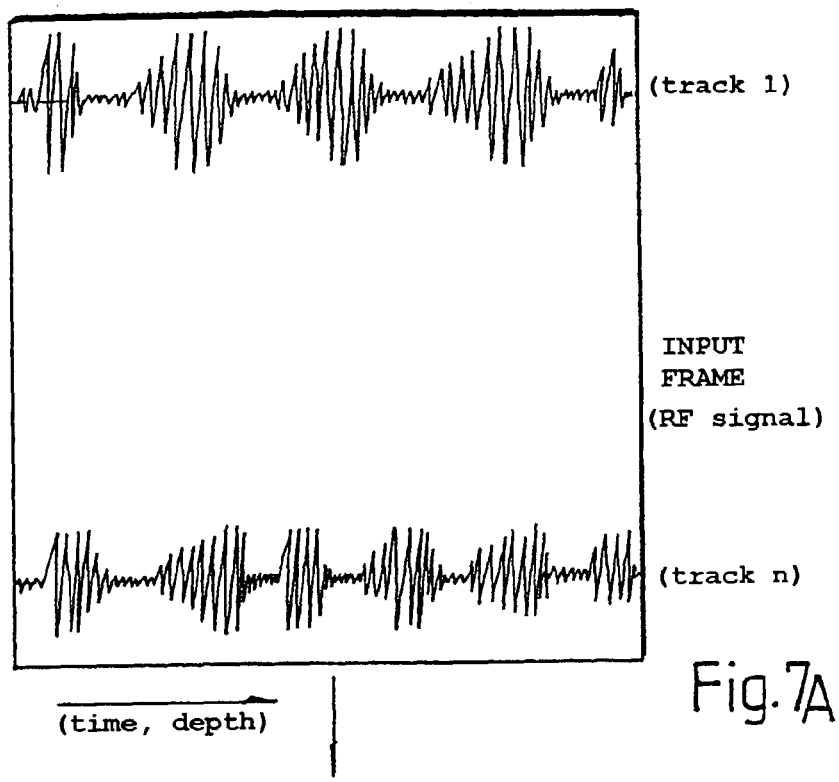
Figure 7B:
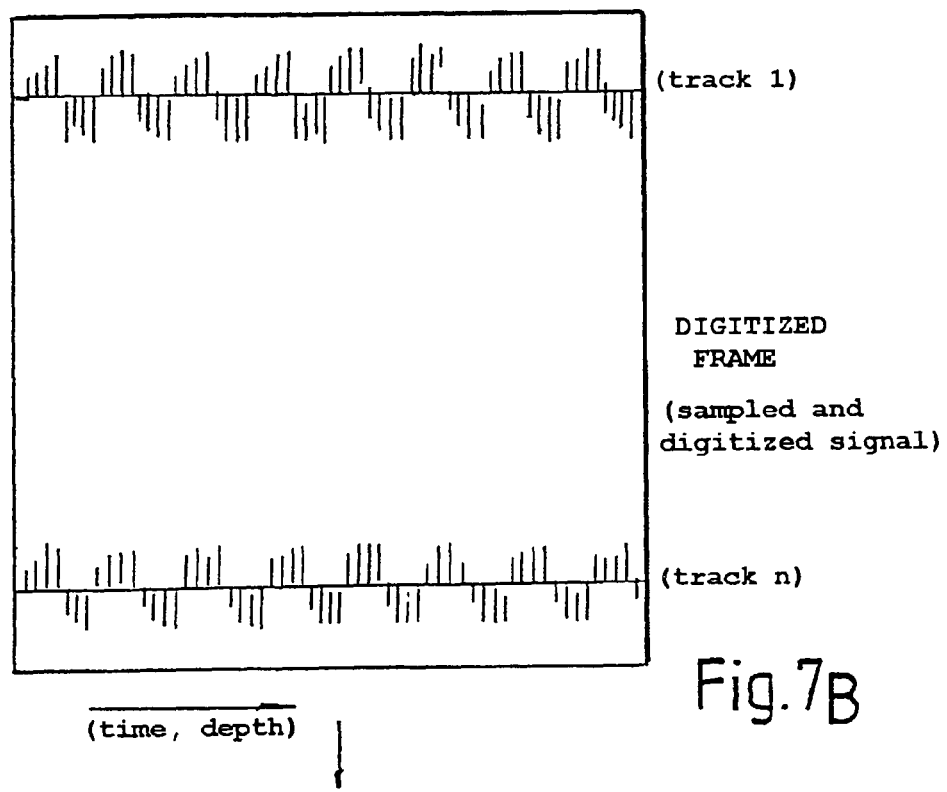

FIG. 7A shows schematically a frame acquired by the scanning head of the echograph. The frame, referred to below as the "input frame", consists of a plurality of n tracks. Each track consists of an analog signal represented by the wavefront reflected or back-propagated by the tissues in which the ultrasonic excitation signal is propagated. After the sampling and digitization, we have a frame (FIG. 7B) which also consists of n tracks, each of which contains a series of digitized signal samples. This frame will be referred to as the "digitized frame".

Figure 7C:
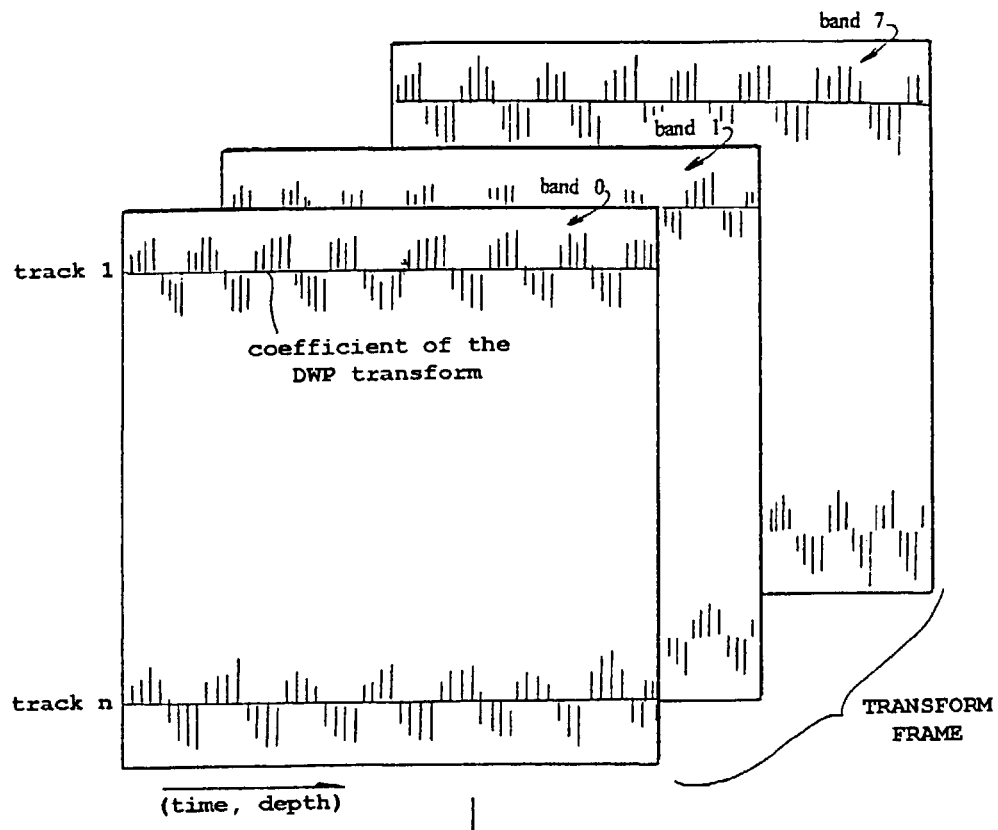

By applying the time-frequency transform to the digitized frame, in other words by filtering the sampled and digitized signal consisting of the set of coefficients forming the digitized frame (shown schematically in FIG. 7B), we obtain a distribution in bands or sub-bands (eight in the present example): in practice, for each track from 1 to n there is, for each instant of time, in other words for each sample in the time direction (in other words in the direction of propagation of the signal), a coefficient in each of the eight bands shown schematically in FIG. 7C and indicated as band 0, band 1, . . . band 7. The coefficients of the time-frequency transform applied, in this case the discrete wavelet packet transform (DWPT), are shown in the various bands. The frames containing the coefficients of the time-frequency transform are referred to below as the "transform frames".

Figure 7D:
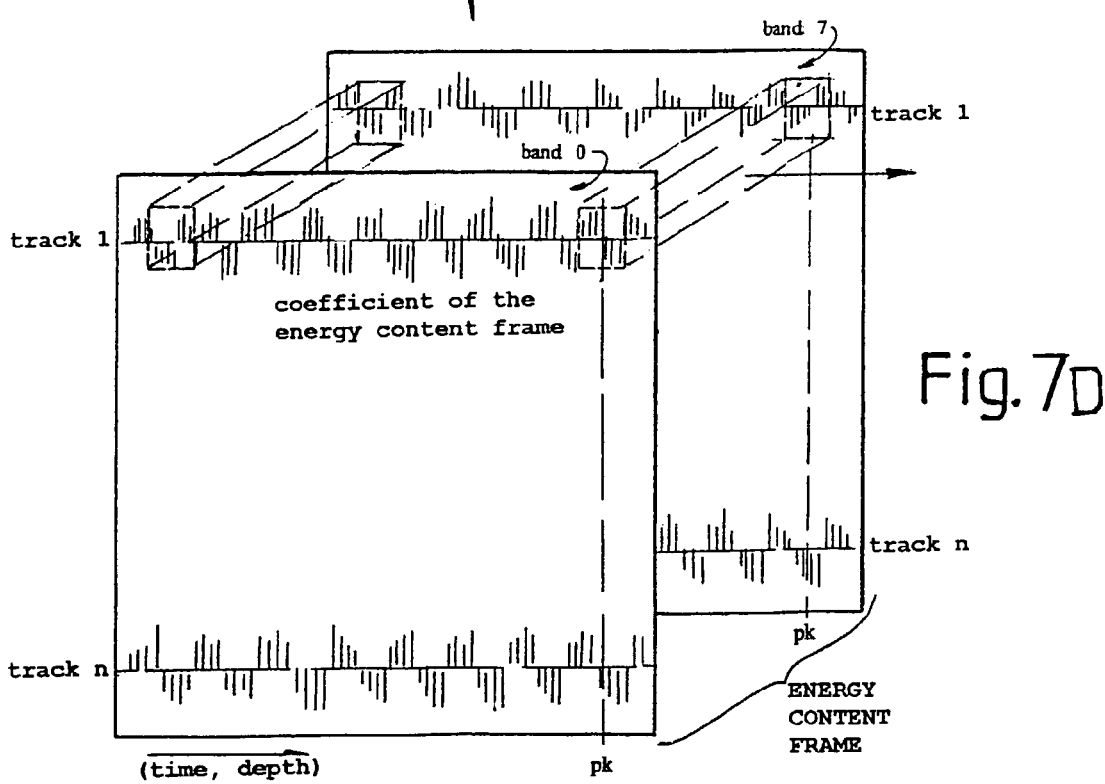

In a subsequent step, the coefficients of the transform frame, in the various frequency bands, are processed to extract a distribution of the energy content of the signal. This operation is carried out on each track of the frame and in each band. It essentially consists in the construction of a frame, referred to below as the "energy content frame", whose coefficients represent the energy content of the signal along each track, in other words in the direction of the depth of propagation of the signal. FIG. 7D shows schematically the coefficients representing the energy content of the signal, which are divided into the eight frequency bands and which form the energy content frame for each band.

The next operation consists in the extraction of a local spectral parameter of the signal for each point of the energy content frame (and therefore for the various points of the input frame from which the energy content frame has been derived by the operations summarized above). For this purpose, the coefficients of the various bands 0-7 are taken for each instant of time, in other words for each point along the time dimension (in other words, the depth dimension), and an interpolating polynomial which approximates the variation of these coefficients is found. This operation is shown schematically in FIGS. 7D and 7E. More particularly, FIG. 7D shows the coefficients of the energy content frame in the various sub-bands relating to track 1 and the instant Pk. These coefficients are shown aligned with each other in the first diagram of FIG. 7E, where PI indicates the interpolating polynomial.

The local spectral parameter which was required is represented (as described in greater detail below) by one of the coefficients of this interpolating polynomial. This parameter is indicative of the variation of the spectral characteristics of the signal. This is because it is related, by definition, to the properties of the polynomial which approximates the variation of the coefficients (representing the energy content of the signal) in each band for each point of the energy content frame, and therefore, indirectly, of the input frame. In other words, the spectral parameter extracted from the interpolating parameter PI provides a qualitative indication of the variability of the spectral characteristics of the RF at a given point of the input frame.

Since the interpolating polynomial is calculated for each coefficient (in the various decomposition bands) of the energy content frame, the result of this operation will be a frame consisting of the set of spectral parameters. This frame, referred to below as the "spectral parameter frame", is shown in FIG. 7F, where the individual values of the spectral parameter are indicated by $a_{ij}$, where i varies from 1 to n, n being the number of tracks in the frame, and j varies from 1 to m, m being the number of coefficients per track.

The next operation consists in the classification of the values of the spectral parameter obtained in this way. After it had been found that a given type of tissue (neoplastic tissue for example) caused a spectral alteration in the RF signal, it was established that this spectral alteration was manifested in an alteration of the value of the local spectral parameter. For a given tissue (prostate gland tissue, for example) containing a neoplasm, for example, the spectral parameter falls into a different class of values from that containing the same spectral parameter found for healthy tissue.

Figure 7G:
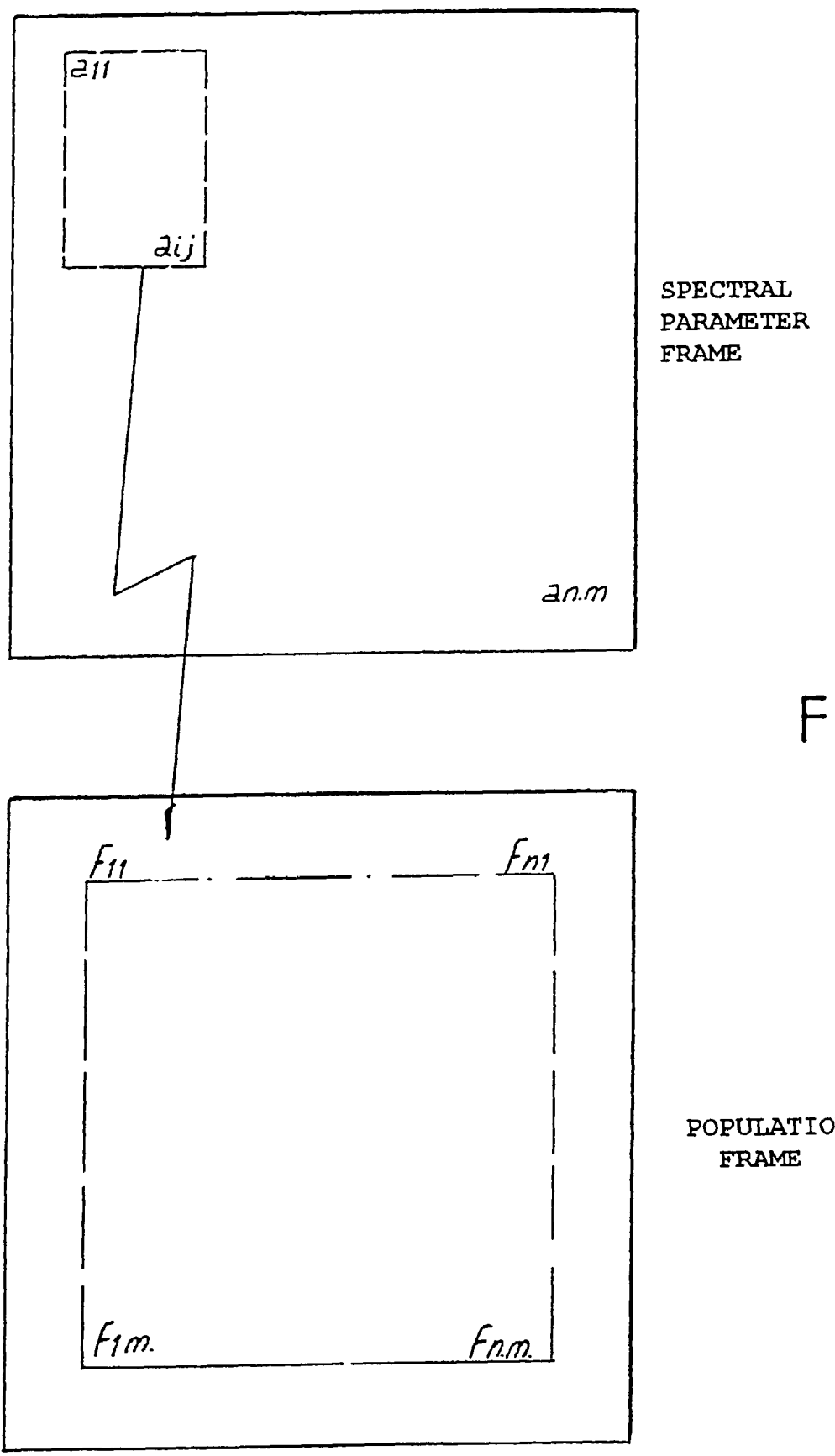

The method therefore classifies the values taken by the spectral parameter throughout the spectral parameter frame, in order to determine whether, in some regions of the spectral parameter frame, this parameter statistically takes values which fall in the (experimentally determined) class which characterizes neoplastic tissue. The result of this operation is again a frame of coefficients, which represent the frequency with which the spectral parameter falls within a given predetermined class of values. FIG. 7G shows this transfer schematically: a window is moved over the spectral parameter frame, and, for each position of the window, the number of parameters ($a_{ij}$) belonging to this window and falling within the predetermined class is found. This value becomes the coefficient $f_{ij}$ of the output matrix or frame, which is referred to below as the "population frame".

An operation of determining the mean of the coefficients located within a window which is moved over the frame is used to derive from the population frame a frame of mean values, in which each coefficient represents the mean value of the coefficients of the population frame within the window for each position of the window on the population frame. The coefficients of this frame are used to generate an image consisting of a color scale, whose colors are determined by the values of the coefficients of said frame. The image obtained in this way can be superimposed on the B-mode image on a grey scale normally generated by the echograph. The colors of the color scale indicate the presence or absence of tumor tissue. Superimposition on the B-mode image enables the tumor tissue to be located within the organ under examination.

Figure 8:
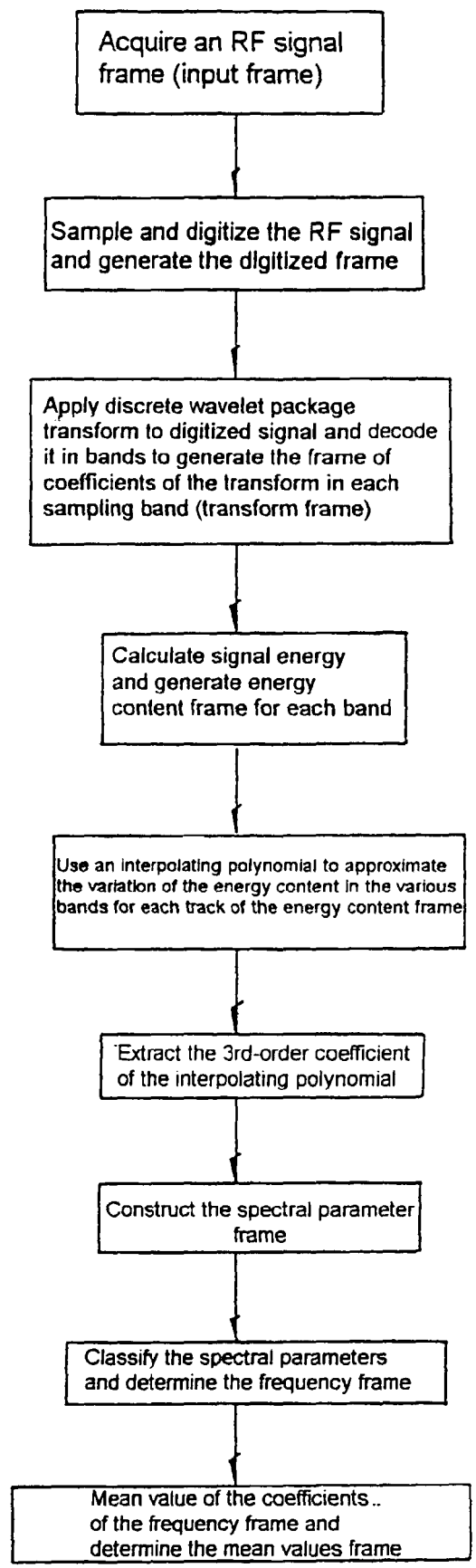
FIG. 8 is a block diagram summarizing the sequence of processes.

The operations summarized above with reference to FIGS. 7 and 8 will now be described individually in greater detail.

Application of the Time-Frequency Transform to the Sampled and Digitized Signal (Decomposition into Frequency Bands or Sub-Bands) (FIG. 7C)

The sampling and digitizing operations are not described in detail, since they are already known. However, the characteristic operations of the method according to the present invention for obtaining the mean value frame from the digitized frame are analyzed below.

In order to obtain the transform frame, the digitized signal must be decomposed into frequency bands or sub-bands. In each band into which the signal is decomposed, there will be a matrix or frame containing the coefficients of the time-frequency transform. For each frequency band, a series of coefficients equal to the number of signal samples present along each track of the digitized frame will be obtained.

Figure 9:
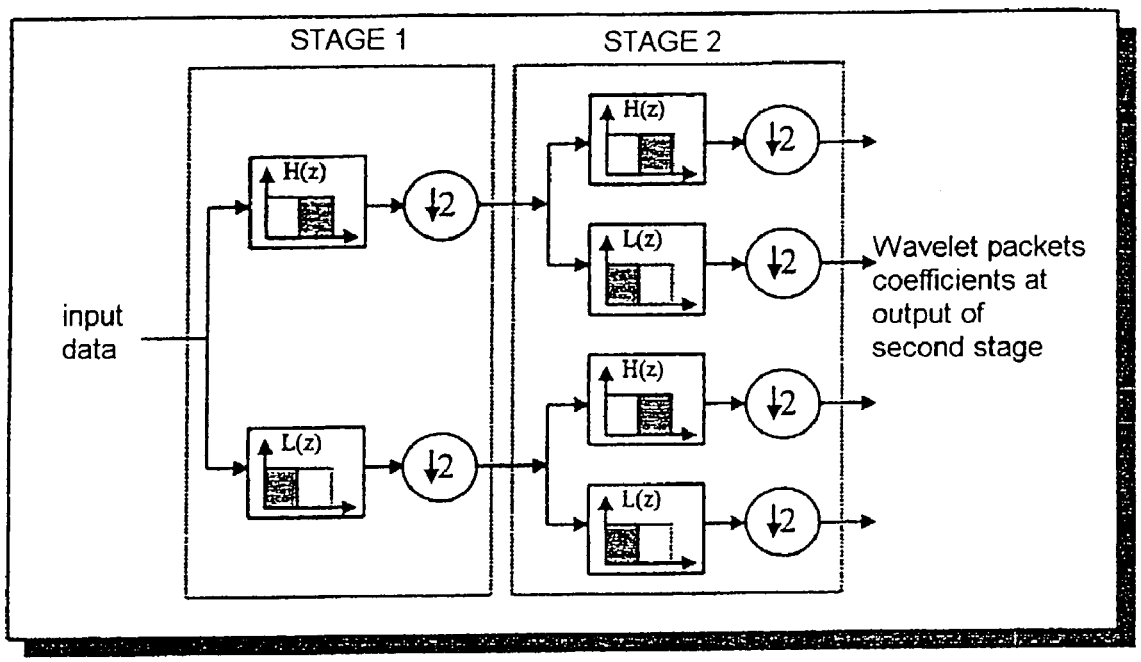
FIG. 9 shows a filter circuit for the decomposition of the signal by the discrete wavelet packet transform (DWPT)

FIG. 9 shows the decomposition algorithm which provides a cascade filter which yields the coefficients of the transform frame. In the illustrated example, the filtering is carried out with a sequence of high-pass and low-pass filters and a series of decimation operations; however, the decimation operations could be omitted. The filtering carried out on the digitized frame is essentially equivalent to the application of the discrete wavelet packet transform.

Each stage of the cascade can be made in the form of two filters which operate in parallel on the data from the low-pass and high-pass branches of the preceding stage. However, since each stage has the same structure, the simplest solution is to provide a single pair of FIR filters and to iterate the filtering, with temporary storage of the results of each stage so that these can then be supplied as the input for the next filtering operation, according to the diagram in FIG. 10.

Figure 6B:
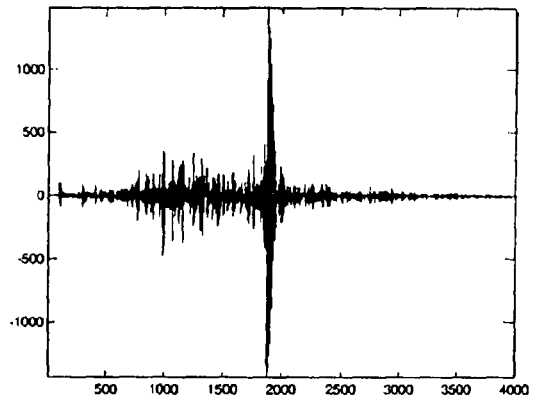
FIGS. 6B to 6D show, respectively, the RF response signal, the Daubechies 16 wavelet used for filtering the digitized RF signal, and the coefficients of the DWPT obtained by decomposition into eight bands.
Figure 6C:
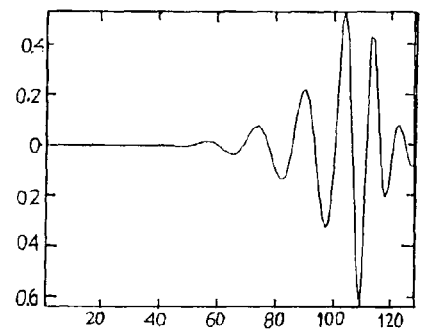
Figure 6D:
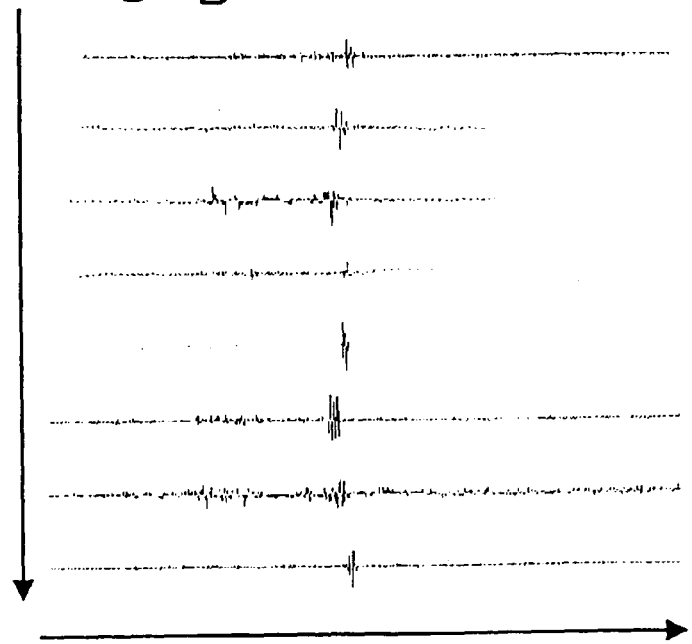

The filter coefficients can be defined by using a Daubechies 16 wavelet. By way of example, FIG. 6C shows the variation of the Daubechies 16 wavelet and FIG. 6D shows the variation of the DWPT coefficients obtained by filtering the digitized and sampled RF signal of FIG. 6B.

The number of filter coefficients is generally low, being 32 for the Daubechies 16 filter for example, and the coefficients can therefore be implemented easily in a commercially available circuit, which can normally provide filters with a limited number of coefficients, not exceeding 64 for each section, with decimation for 4 and if the filter is not of the linear phase type, while a maximum of 128 can be obtained with two sections in cascade. The coefficients of the filters which provide a wavelet transform are defined recursively and are known. For example, it is possible to use the coefficients defined in U.S. Pat. No. 6,066,098, the content of which is incorporated in the present description.

Figure 10:
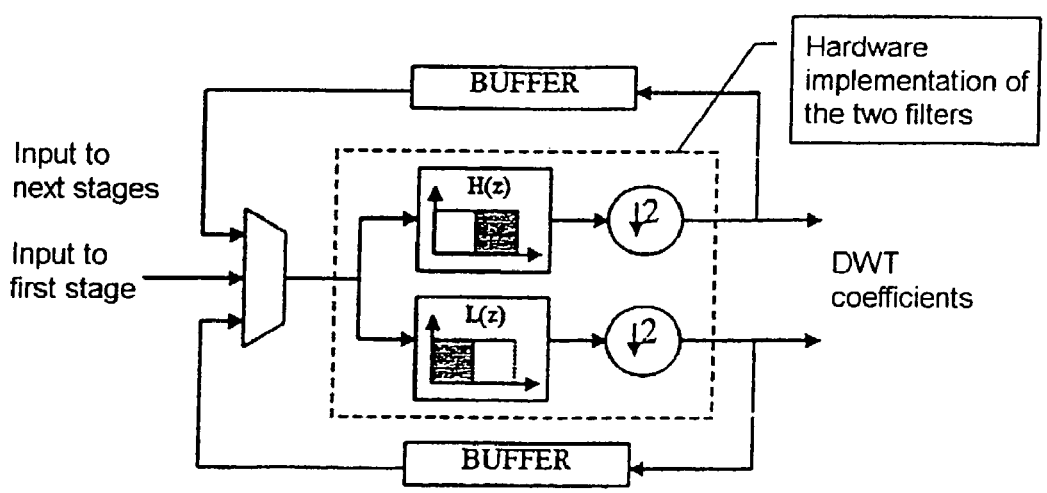
FIG. 10 shows an implementation of the decomposition algorithm with a single pair of filters.

A further advantage of the layout in FIG. 10 is that the coefficients remain the same for each iteration, since the filters do not change.

A disadvantage of this layout is that the output data depend on those obtained from the intermediate processes, and consequently, if, for example, the coefficients for the fourth level of decomposition are to be calculated, it is necessary to pass through all the intermediate levels. It would therefore be necessary to have processing times which increase considerably with a rise in the desired decomposition level, owing to the excessive number of filtering operations; it would also be necessary to use an additional store to store the results of the intermediate filtering operations, thus increasing the amount of logical components present on the card. Moreover, it should be noted that the hardware implementation of this type of algorithm by means of an integrated digital filter causes a progressive loss of accuracy on each successive iteration, since the output data are truncated to a number of bits which is smaller than that used by the internal arithmetic.

To overcome these drawbacks, it is preferable to use equivalent filters to obtain each branch, starting from the root of the decomposition tree, in other words to parallelize the decomposition algorithm.

This approach requires a reprocessing of the algorithm, making use of certain properties of the filtering by decimation. In particular, the following equivalence can be used:

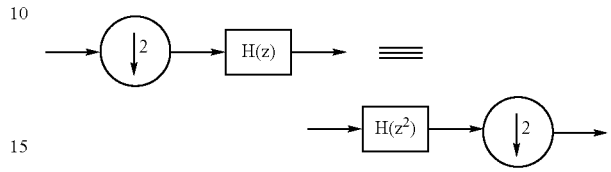

It is thus possible to determine an equivalent filter for each step of the algorithm and to use this filter to obtain the coefficients of the discrete wavelet packet transform (DWPT) of any intermediate output, starting from the customary input data.

For example, if the DWPT coefficients for the output of the second stage are to be found (FIG. 9), it is necessary to examine all the operations carried out on the signal from the input up to the output in question. To calculate the coefficients of the equivalent filter for the following path:

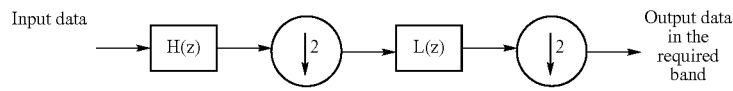

the preceding identity must be applied:

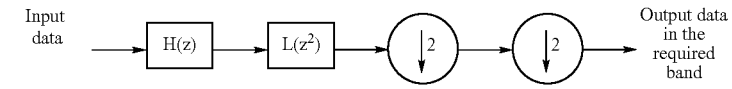

so that we finally obtain.

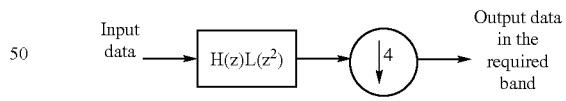

Figure 11:
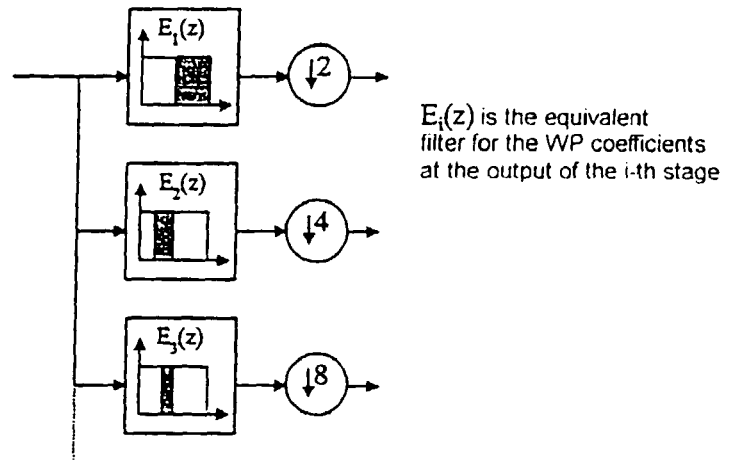
FIG. 11 shows an implementation of the same decomposition algorithm, using parallelized filters.

By applying this procedure to all possible filter paths from the root, passing through the nodes, and up to the leaves of the decomposition tree, we obtain what is known as the parallelization of the algorithm, as shown in FIG. 11. It is immediately apparent that in this configuration the output coefficients depend directly on the input data and the processing now takes place with filters which vary as a function of the frequency band to be analyzed.

It is therefore necessary to use a number of FIR filters equal to the number of bands under examination; this has the advantage of eliminating the dependence of each set of coefficients of the DWP transform on the intermediate data.

The major drawback, apart from the need to use a plurality of different filters, is that the length of said filters increases progressively as the frequency of the analysis decreases, and therefore it is not possible to continue beyond a certain level of decomposition. However, for the purposes of the present invention, it is sufficient to decompose the signal to the third level, in other words into eight frequency bands, and this can be achieved with a filter length well within the acceptable limits.

Figure 12:
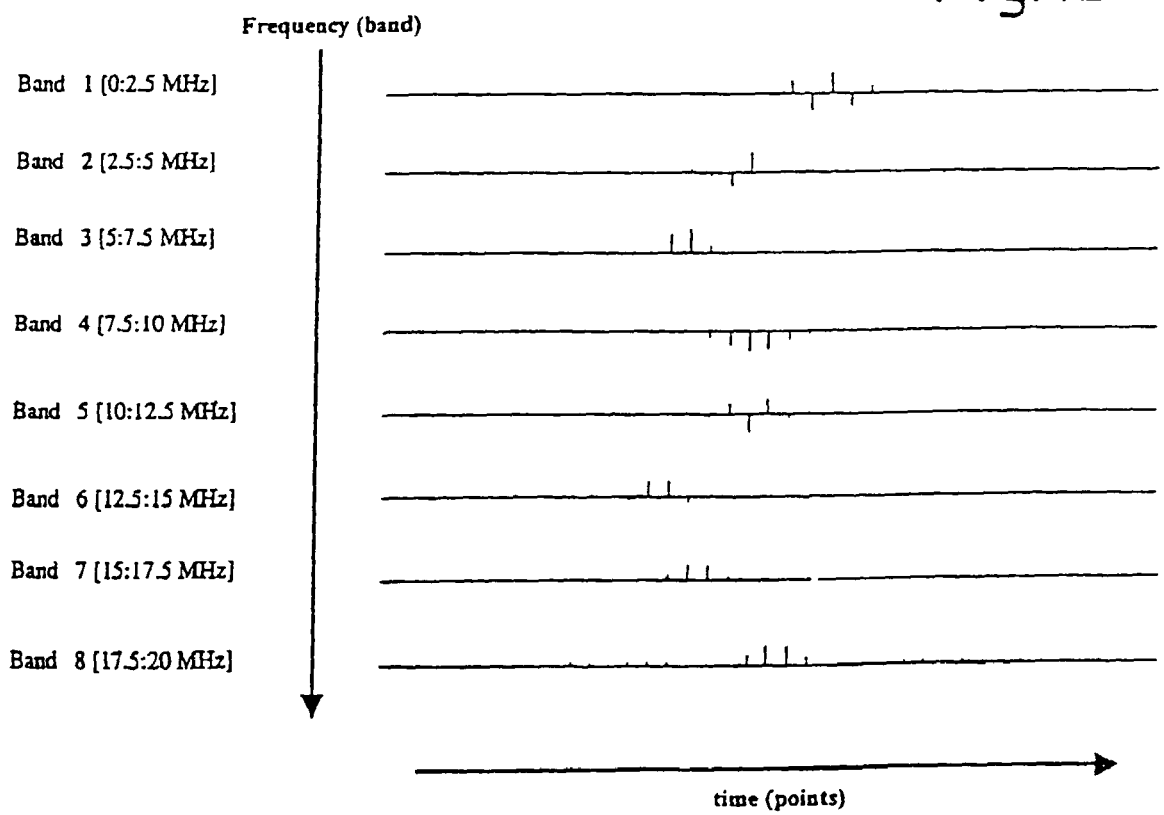
FIG. 12 shows the band coefficients obtained by application of the DWP transform for a track of the input RF signal.

The operation of filtering the digitized frame as described above essentially yields an encoding in bands, in other words a series of matrices or frames containing the coefficients of the discrete wavelet packet transform for each track of the original frame. By decomposing the digitized signal to the third level, eight bands are obtained, for each of which a frame of coefficients of the transform is obtained at the output of the filtering unit, the set of frames forming the transform frame. Each frame consists of a plurality of tracks; each comprising a series of coefficients of the discrete wavelet packet transform. FIG. 12 shows the coefficients of the discrete wavelet packet transform obtained by decomposition to the third level (eight bands), for a single track of the digitized frame (at the input of the filter unit).

Calculation of the Energy Content Frame (FIG. 7D)

The next operation performed on the coefficients forming the transform frame consists in the extraction—for each subband—of a frame whose content is a function of the signal energy (the energy content frame). This operation is performed for each track as follows.

Figure 13:
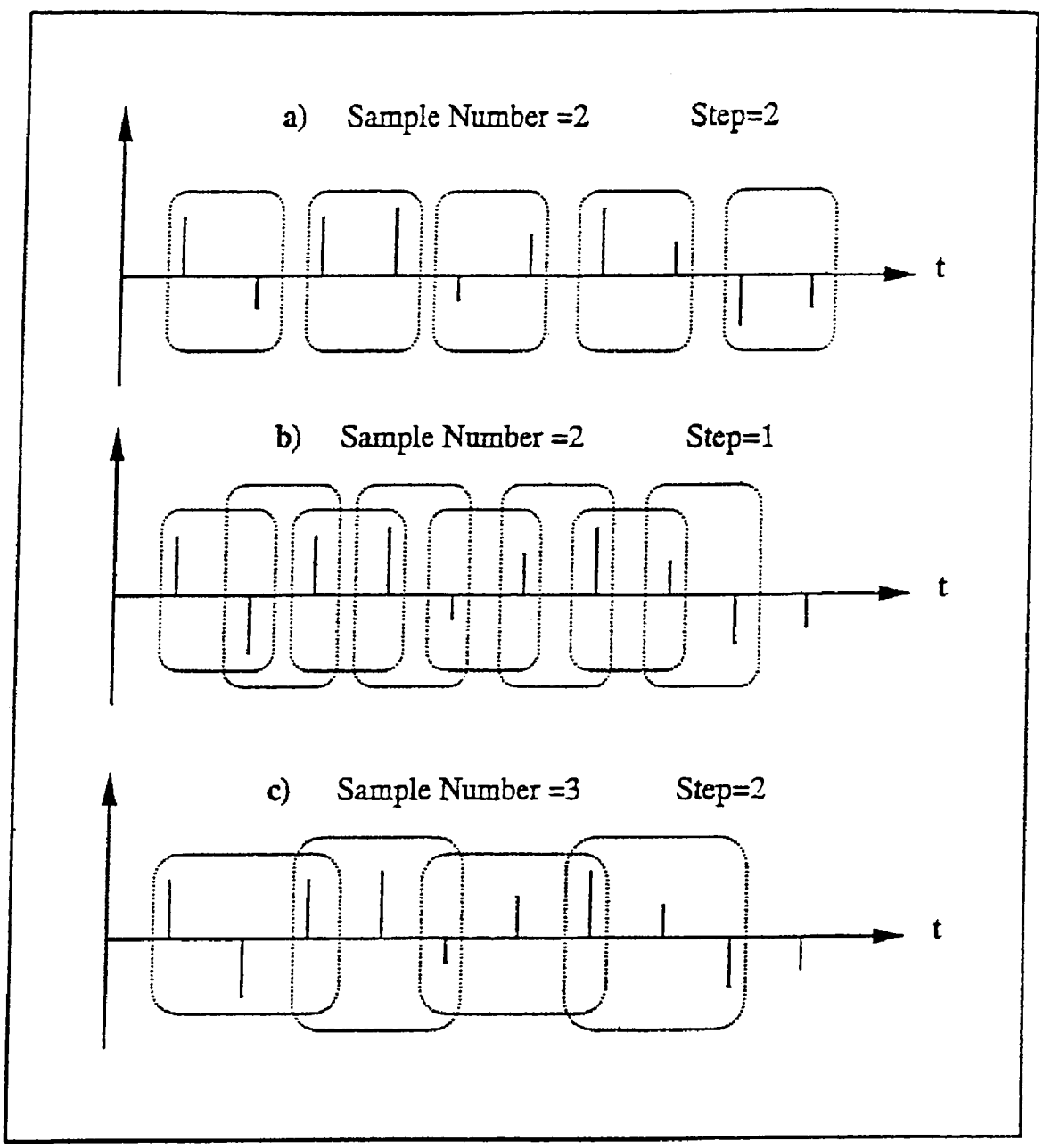
FIG. 13 shows schematically the process for calculating the signal energy.

For each track of the transform frame, in each frequency band into which the digitized frame has been decomposed, the energy content is calculated; in other words a certain number of consecutive samples of each track is examined (FIG. 13) and their absolute value is determined, after which the absolute values are added together and the sum is multiplied by the time interval between the samples ($T_{wp}$) which is:

$$T_{wp}=8/F_c$$

where $F_c=40$ MHz, the RF signal sampling frequency. The fact that $T_{wp}$ is eight times the sampling time is due to the decimation operation performed on the samples of the eight bands.

Figure 14:
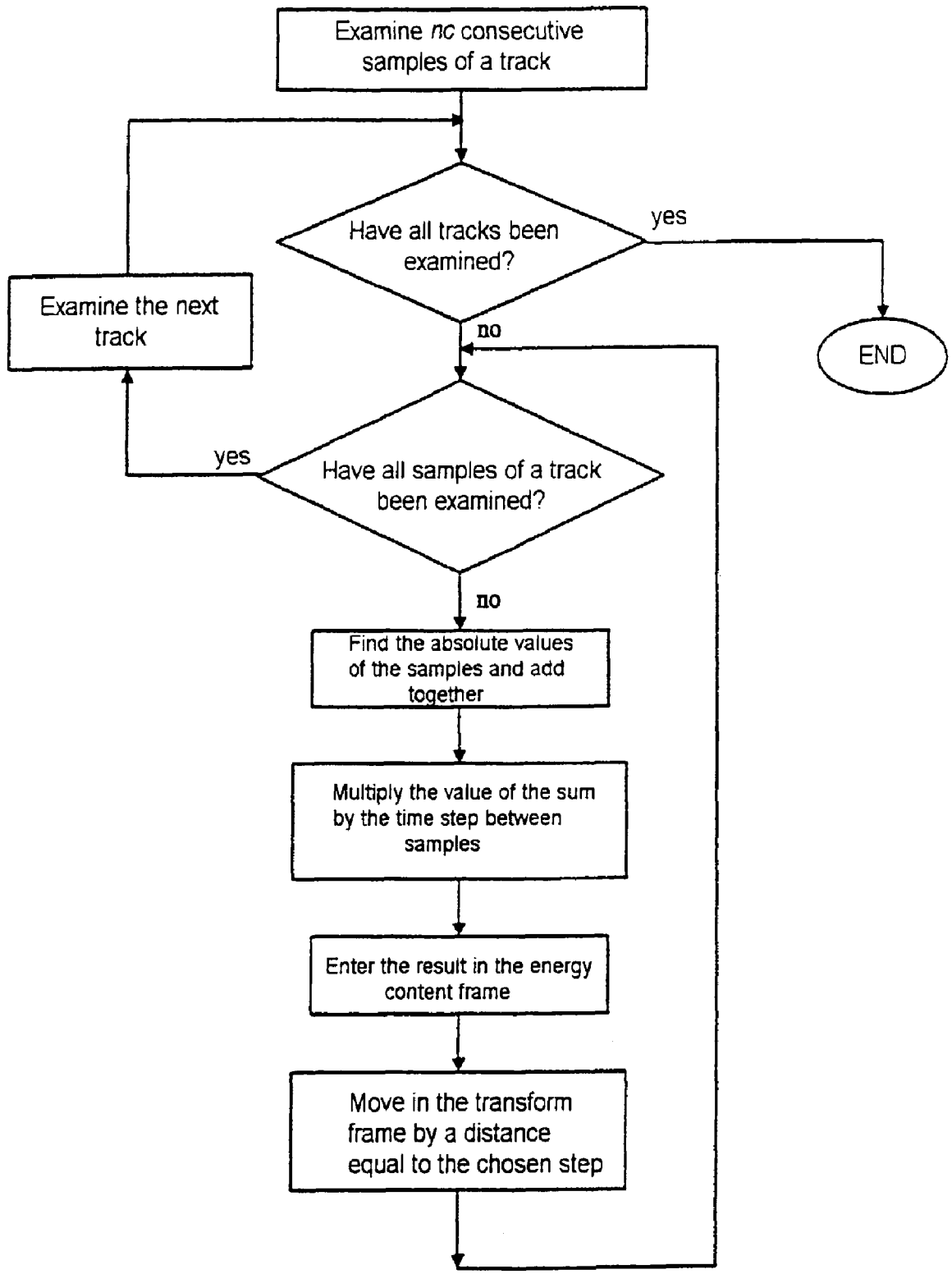
FIG. 14 is a block diagram of the module for calculating the signal energy.

FIG. 14 shows a block diagram of the operation of calculating the signal energy by the procedure described above. In the diagram in FIG. 14, the signal energy is calculated by taking the coefficients two by two, without superimposition (as in FIG. 13(a)), along the single track of the transform frame in a given decomposition band. This method of calculating the energy is a compromise between high resolution and low computational cost, but it is also possible to use a different method, for example by examining a greater number of track samples for each step and/or by superimposing the successive steps, in other words arranging for some samples to be examined more than once. FIG. 13(b) shows the operating procedure in which two coefficients are examined in each step, with a superimposition of one coefficient between consecutive steps, while FIG. 13(c) shows the procedure in which three coefficients are examined in each step, with a superimposition of one coefficient between consecutive steps.

Since the operation is performed for each track of each frame in each band into which the signal has been decomposed, if nc is the number of samples from which the energy is calculated, there is a reduction by a factor nc in the number of samples in the output frame. With this operation, therefore, if nc=2, the output of each band will be an energy content frame which has the same number of tracks as the transform frame, but a different number of coefficients per track, being equal to half, or to half minus one, of the number of transform frame coefficients, depending on whether the latter are even or odd respectively.

Figure 15:
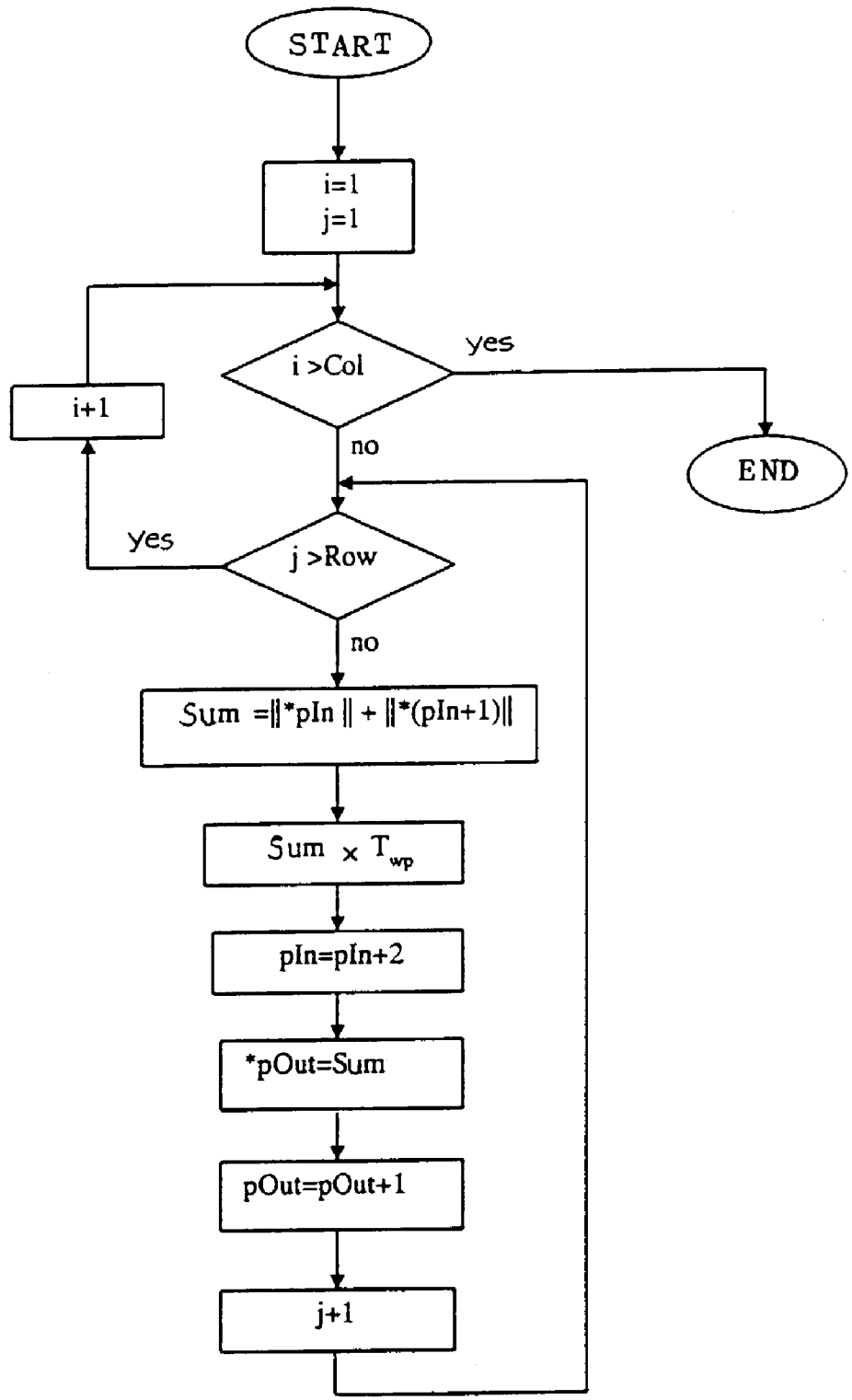
FIG. 15 shows the flow chart for the calculation of the signal energy.

FIG. 15 shows the flow chart for this operation. The counters i and j represent the counters of the columns and rows of the energy content frame, in other words the number of tracks (counter i) and the number of samples or coefficients per track (counter j), Col and Row represent, respectively, the number of tracks and the number of samples or coefficients per track of the energy content frame for the signal, pIn and pOut represent the pointers to the transform frame and to the energy content frame respectively, and *pIn and *pOut indicate the corresponding locations in the corresponding frame.

Determination of the Local Statistical Parameter (FIGS. 7D-7E)

The next step is to extract the local statistical parameter, representing the local variation of the spectral content, from the energy content frame calculated in the preceding step for each band, and to generate the spectral parameter frame, which consists of the spectral parameters calculated for each point of the energy content frame.

For this purpose, the coefficients in the various bands relating to the same instant are taken for each track of the energy content frame (see FIG. 7D), and an interpolating polynomial of suitable degree (FIG. 7E) is determined and is used to approximate the variation of these coefficients. One of the coefficients of this polynomial represents the required local spectral parameter. The degree of the polynomial and the coefficient are selected experimentally on the basis of an analysis of a plurality of tissues and of the characteristics of the echographic signal which these tissues send in response to excitation by the transducer of the echograph. In particular, experimental analysis has shown that, in order to achieve good characterization of the prostate tissue, it is preferable to use a fourth degree interpolating polynomial and to extract the third-order coefficient of this polynomial. As shown clearly in the schematic representation in FIG. 7D, the result of this operation will be a frame consisting of a number of coefficients equal to the number of coefficients of the energy content frame in a band, in other words a frame which has a number of rows equal to the number of tracks of the input RF signal and a number of columns equal to the number of columns of the energy content frame (the number of samples of the digitized frame reduced by a factor nc equal to the step used in the calculation of the energy content of the signal and by a value dependent on the decimation carried out during the filtering of the signal).

Figure 16:
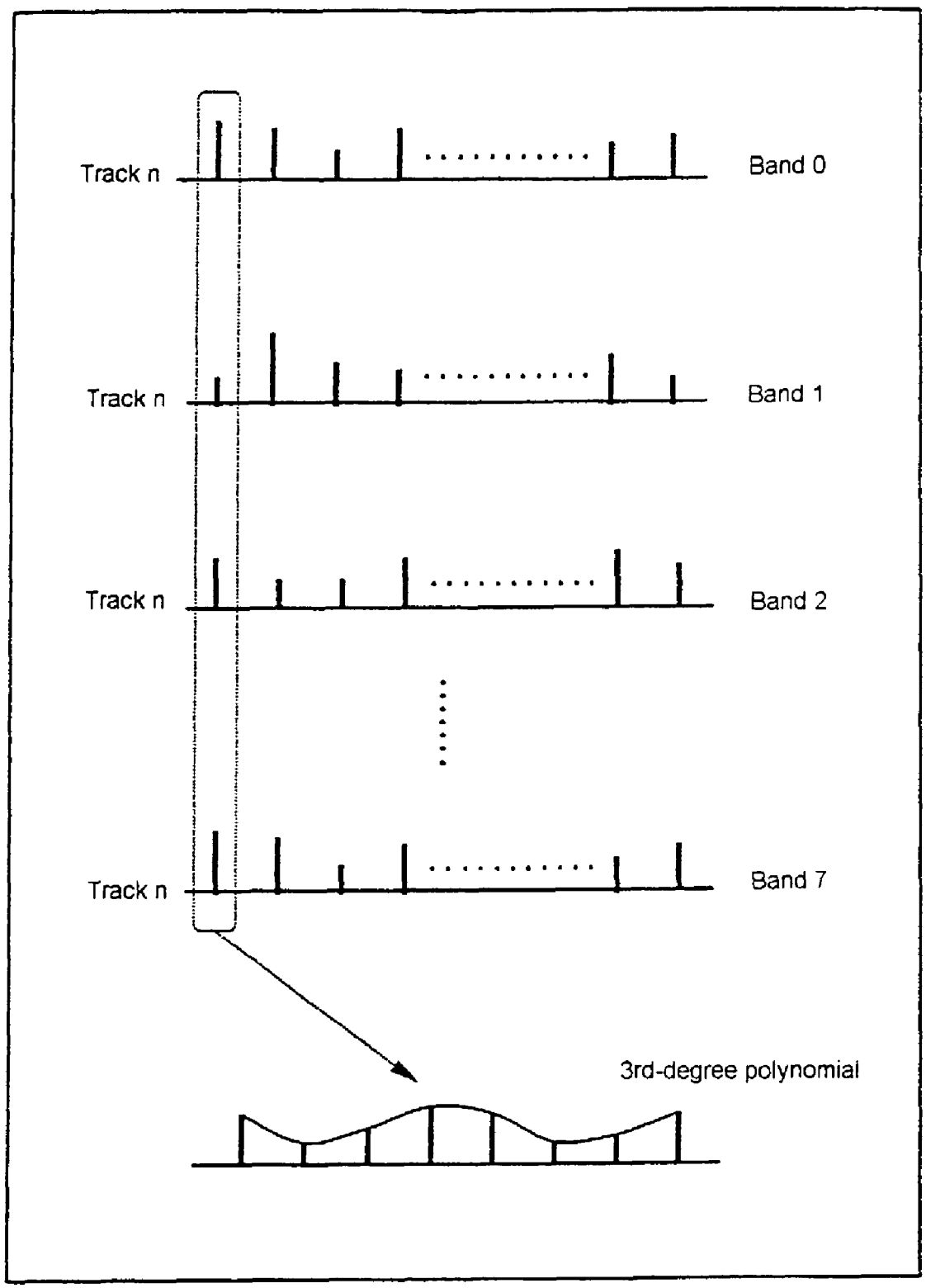
FIG. 16 shows schematically the interpolation operation for determining the local spectral parameter for a given track of the signal.

FIG. 16 shows schematically the operation of determining the interpolating polynomial for the coefficients in bands 0-7 relating to one instant of the n-th track.

The least squares method of approximation is useful for the calculation of the values of the coefficients of the polynomial.

This method can be used to determine the polynomial of degree m<n−1, given a number n of experimental observations $y_0, y_1, \ldots, y_{n-1}$, corresponding to the abscissae $x_0, x_1, \ldots, x_{n-1}$:

$$P(x)=a_0+a_1x+\ldots+a_mx^m$$

which gives the best approximation of the detected data.

Considering the sum S of the squares of the differences between the approximate and the observed values, $$S = \sum_{j=0}^{n-1}(a_0 + a_1 x_j + \ldots + a_m x_j^m - y_j)^2$$

the coefficients must be selected in such a way that S is minimal, in order to make the polynomial approximate the data as closely as possible. By deriving S with respect to the coefficients and equalizing the result to zero, and given $$s_k = \sum_{j=0}^{n-1} x_j^k, \text{ and } v_k = \sum_{j=0}^{n-1} x_j^k y_j,$$

we obtain the system of equations which can be written in matrix form as:

a=Q$^{-1}$v where a is the vector of the coefficients of the polynomial P(x).

Figure 17:
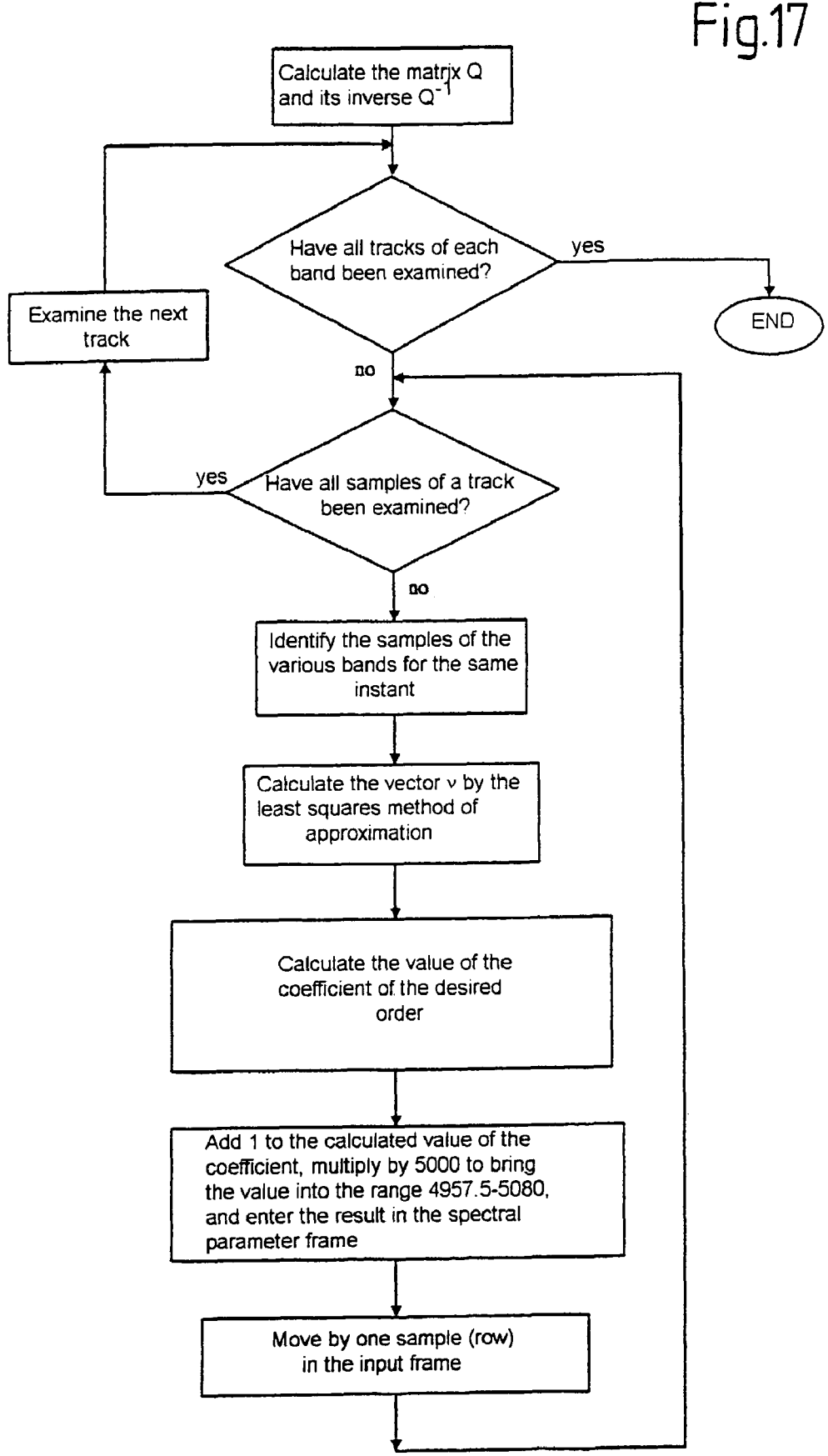
FIG. 17 shows the block diagram for calculating the local spectral parameter.

FIG. 17 shows the block diagram of this operation to explain how it is performed. This module is used to calculate the matrix Q, its inverse Q$^{-1}$ and the vector v (m_pflV), and the value of the coefficient of the desired order is determined, this order being the third ($a_3$) in the present case, by finding the product of the fourth row of Q$^{-1}$ and the vector v. This value is then multiplied by 5000 and added to 5000, in order to bring the value into the range 4957.5-5080, which is determined experimentally and the significance of which is explained below.

The vector v was calculated by examining the logarithm of the coefficients of the eight bands for the same instant of time and the values of the corresponding abscissae.

Figure 18:
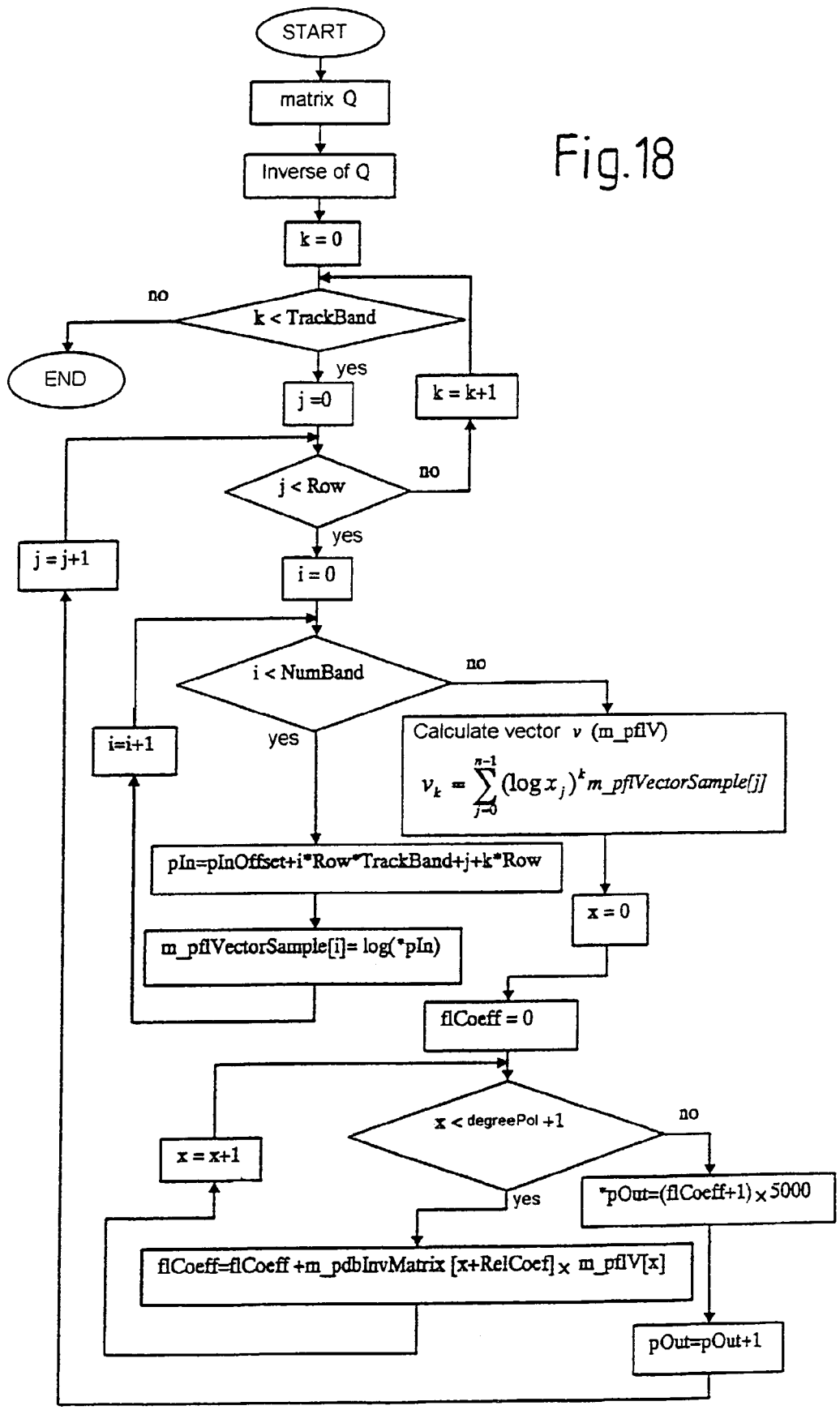
FIG. 18 shows the flow chart for the calculation of the local spectral parameter.

FIG. 18 shows in detail the flow chart representing the operation required for calculating the local spectral parameter for all points of the energy content frame. The Row variable represents the number of samples per track of the input frame, NumBand=8 is the number of spectral bands (band 0 ... band 7) into which the signal has been encoded by the time-frequency transform, TrackBand is the track number for each of the selected bands, RelCoef is the value identifying the row of the matrix Q$^{-1}$ to be multiplied by the vector v (RelCoef=Order of Coefficient×(Degree of Polynomial+1)), pIn and pOut are the pointers to the input and output frames (the energy content frame and the spectral parameter frame respectively). *pIn and *pOut indicate the corresponding locations within the frame.

Ultimately, on completion of the operation described above, we obtain a frame or matrix (frame of spectral parameters) consisting of the set of third-order coefficients of the interpolating polynomial, calculated for all coefficients of the energy content frame in all the spectral bands. Each coefficient is a local spectral parameter, indicating the characteristics of the spectrum of the RF signal at each point of the frame entering the system.

Determination of the Distribution of the Spectral Parameter in the Reference Classes (FIG. 7G)

It was found that the spectral parameter obtained by the procedure described above took values which could be classified in different classes, and that it was indicative of the tissue characteristics of the examined organ. In other words, areas affected by neoplasms, for example, are characterized by values of the spectral parameter which fall in a given class of values. The ranges of values defining the individual classes are determined experimentally on the basis of a series of experimental observations. Other diffusers or reflectors present in the examined tissue (such as calcifications, adenomas, etc.) give rise to values of the spectral parameter which fall into a different class, in other words into a different range of values.

The next operation to be performed is therefore the determination of the distribution of the spectral parameter in the relevant classes. For example, once it has been found experimentally that prostate tumor tissue causes a spectral alteration in the echographic signal characterized by values of the local spectral parameter falling within a certain range of classes (or set of classes) of values, the examination of the prostate will be carried out by classifying the values taken by the spectral parameter at the various points of each echographic image (frame), and by establishing for each region of the image the frequency with which the spectral parameter falls within the range of values (in other words in the class or set of classes) characterizing neoplastic tissue.

For this purpose, a window of adjustable dimensions is defined and moved over the frame of the spectral parameters which has been calculated as described above. The window is moved over the spectral parameter frame to determine (for each position of the window) how many coefficients of the spectral parameter frame, within this window, fall within the range which defines the class or set of classes characterizing neoplastic tissue.

For example, when it has been established that the values of the spectral parameter always fall in a range extending from a lower limit to an upper limit, when the range between the lower limit and the upper limit has been divided into four hundred classes, and finally when it has been established that in the presence of a neoplasm the spectral parameter statistically falls within a sub-range of the total range of values (where the sub-range comprises all the classes between an upper and a lower class), the statistical investigation consists in determining how many times the spectral parameter, within the observation window, falls within the range defined by the following values:

(0.30625×(LowerClass−1))+4957.5 and (0.30625×UpperClass)+4957.5, where the value 0.30625 is given by
(UpperLimit−LowerLimit)/NumberClasses
in which
UpperLimit=5080
LowerLimit=4957.5 are, respectively, the upper and lower values of the range comprising all possible values of the spectral parameter, and
NumberClasses=400 is the total number of classes into which the total range between the lower limit and the upper limit has been divided.

The algorithm which executes this calculation requires the use of a counter (flFreqClass) which is incremented by unity whenever there is a comparison with a positive outcome between the value of the spectral parameter in the window in question and the range of values given by the reference classes. At the end of the comparison between each value of the spectral parameter in the window and the reference range, the flFreqClass counter will have taken a value which will be the value to be entered in an output matrix or frame, in other words in the population frame. The counter is then reset to zero, so that it can perform a new check on a different region of the input frame, moving the inspection window by one step.

This operation is performed on the whole spectral parameter frame, by moving the window over it. The size of the window can be 3×50: in other words, it can cover a portion of the spectral parameter frame which covers three tracks or rows and includes, for each of the three tracks, fifty values of the spectral parameter, corresponding to fifty positions along the row of the frame, in other words fifty consecutive instants of time. The window is moved by one step along the row, in other words along the direction of extension of the tracks, until all the coefficients of the first three tracks have been covered, after which it is returned to the start of the tracks and moved by one step along the direction orthogonal to the extension of the tracks.

Figure 19:
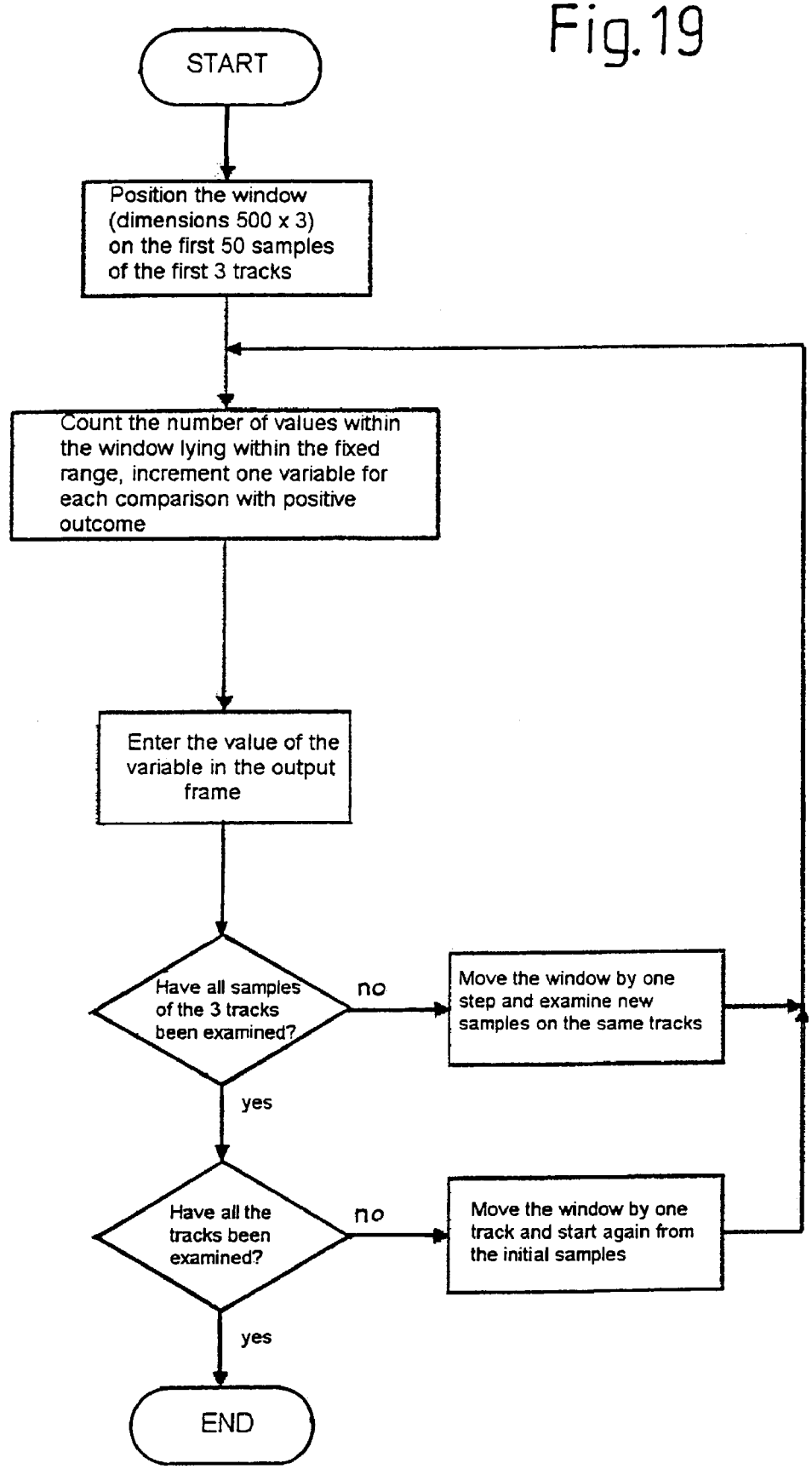
FIG. 19 shows the block diagram for classifying the coefficients relating to the spectral parameter and for generating a frame containing the frequency of the distribution of the spectral parameter in the classes examined.
Figure 20:
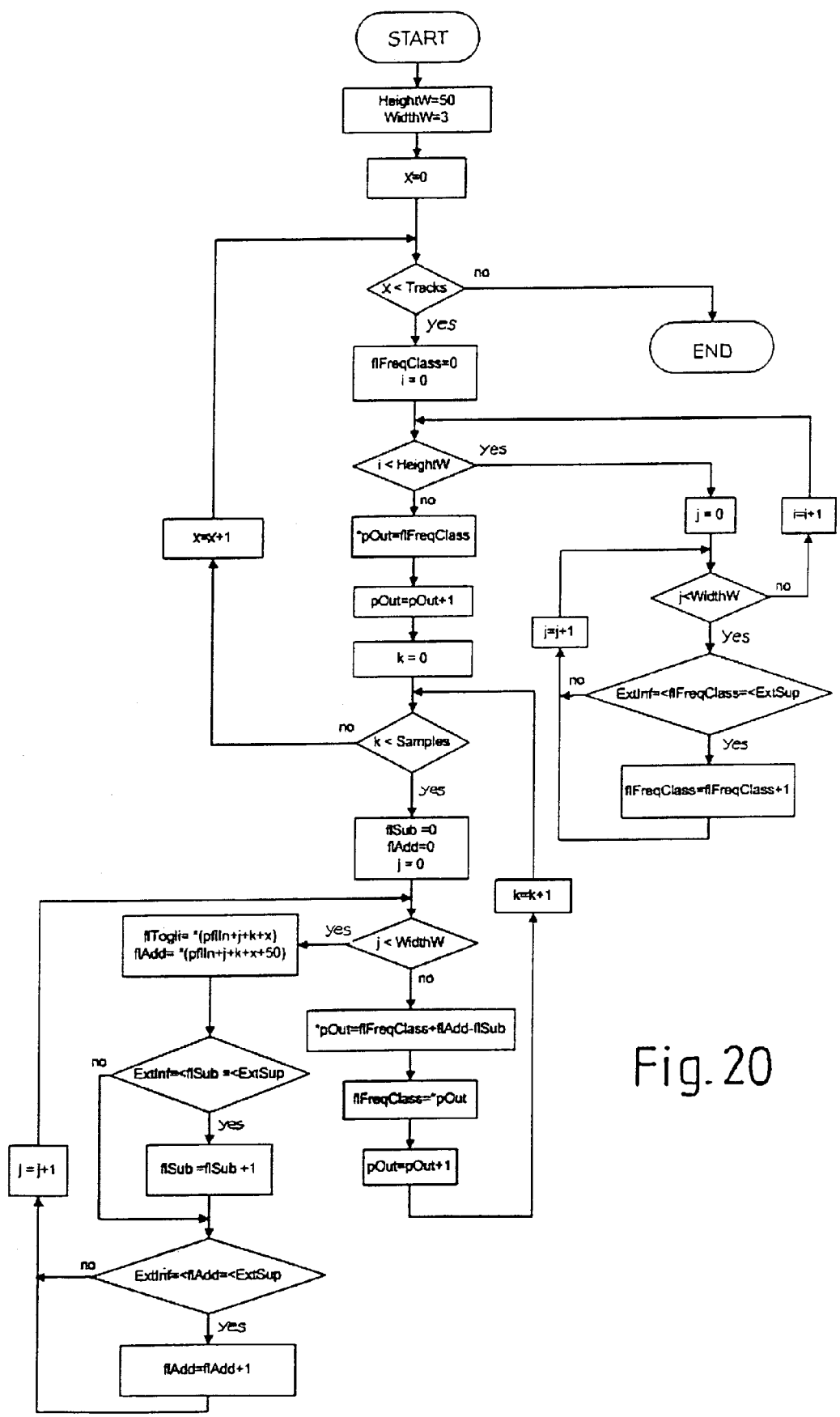
FIG. 20 shows the flow chart corresponding to the block diagram of FIG. 19.
Figure 21:
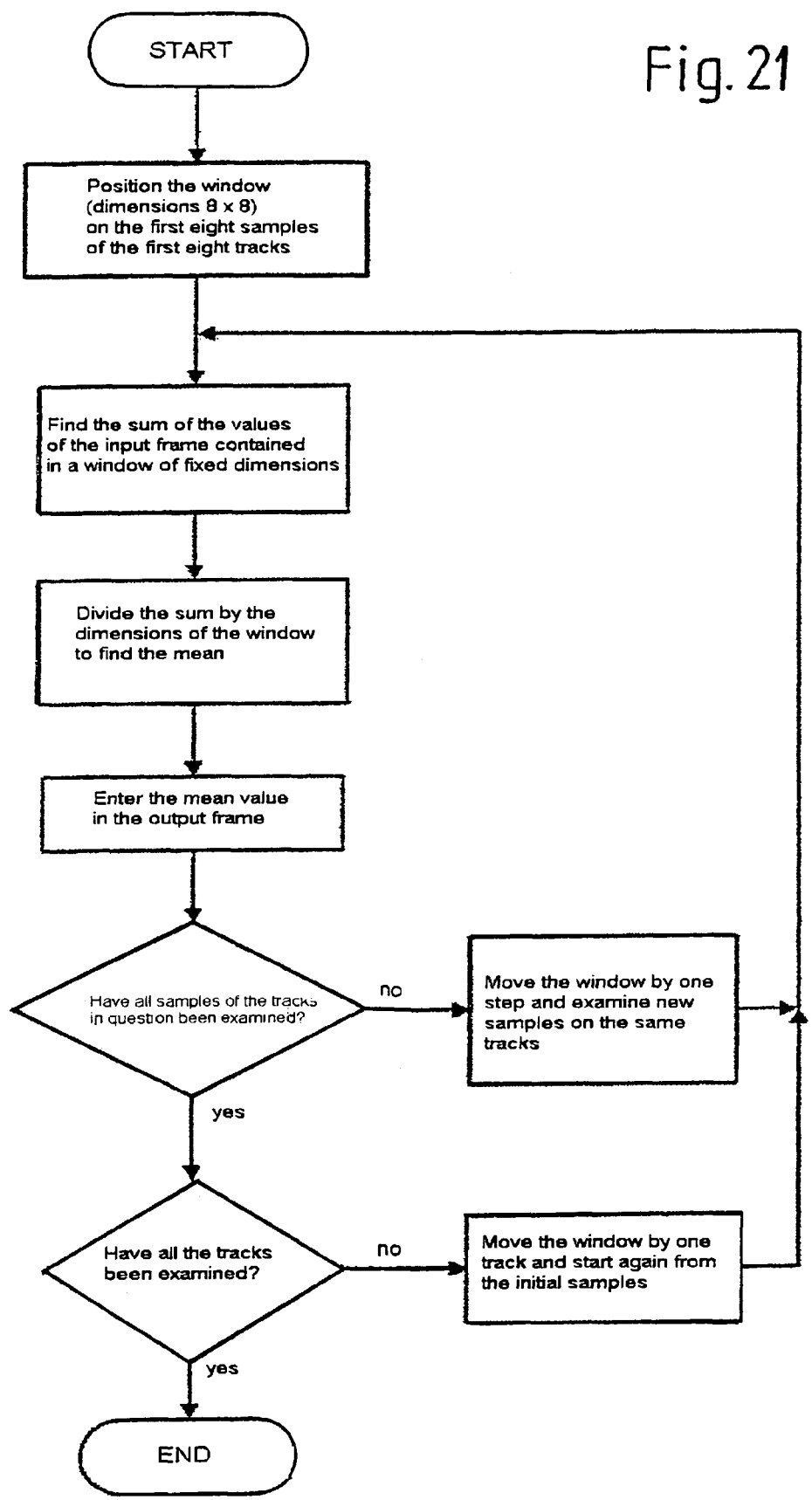
FIG. 21 shows the block diagram for calculating the mean of the coefficients of the frame containing the frequency of the distribution of the spectral parameter.
Figure 22I:
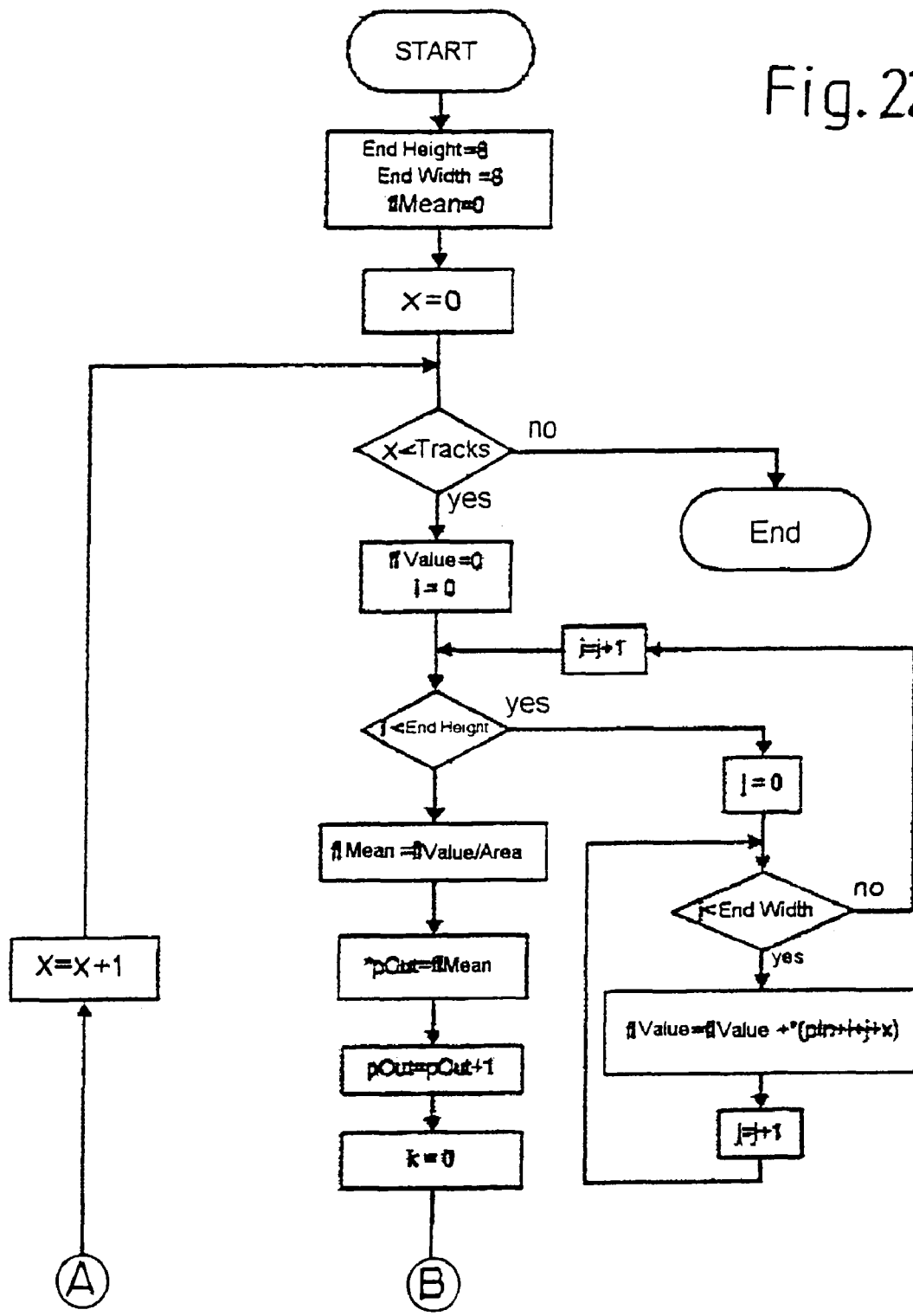
FIG. 22 shows the flow chart corresponding to the block diagram of FIG. 21.

FIG. 19 summarizes this process in a block diagram, while FIG. 20 shows the detailed flow chart. The variables Col and Row represent, respectively, the number of tracks and samples per track of the output frame, pIn and pOut represent the pointers to the input and output frames, and *pIn and *pOut indicate the corresponding locations within the frame. ExtInf and ExtSup denote the limits of the sub-range in question, in other words the range of values in which the spectral parameter statistically falls when tumor tissue is present. The 3×50 window is moved over the statistical parameter frame, by one step at a time along y, in other words along the direction of each track. 50 samples of 3 tracks are evaluated at each step. When the window has scanned all the samples of the first three tracks, it is moved one step along x, the variable flFreqClass is reset to zero and a new scan is started.

This population matrix or frame is used directly by the display module to create an image consisting of a color scale which can be superimposed on the B-mode image of the echograph. To enable the color scale to be superimposed on the B-mode image only in the location where it has diagnostic significance, it is preferable to filter the mean values frame with an absolute or relative threshold which can be set by the user. Thus the B-mode image will show only those points for which the value of the corresponding coefficients in the mean values frame is greater than the threshold value. This is because the tumor phenomena which are to be highlighted are only present in these regions, while the color scale has no significance in the other regions, and would impede the observation of the underlying grey-scale B-mode image.

As mentioned in the introduction, processing by extraction of the energy content of the signal and interpolation with an interpolating polynomial to extract a spectral parameter represented by one of the coefficients of said polynomial is only one of the possible processes included within the broader concept on which the present invention is based.

In a different embodiment of the invention, a direct comparison can be made between two specific frequency bands, to extract a local spectral data element based on the variation of the coefficients in these two bands.

Figure 23:
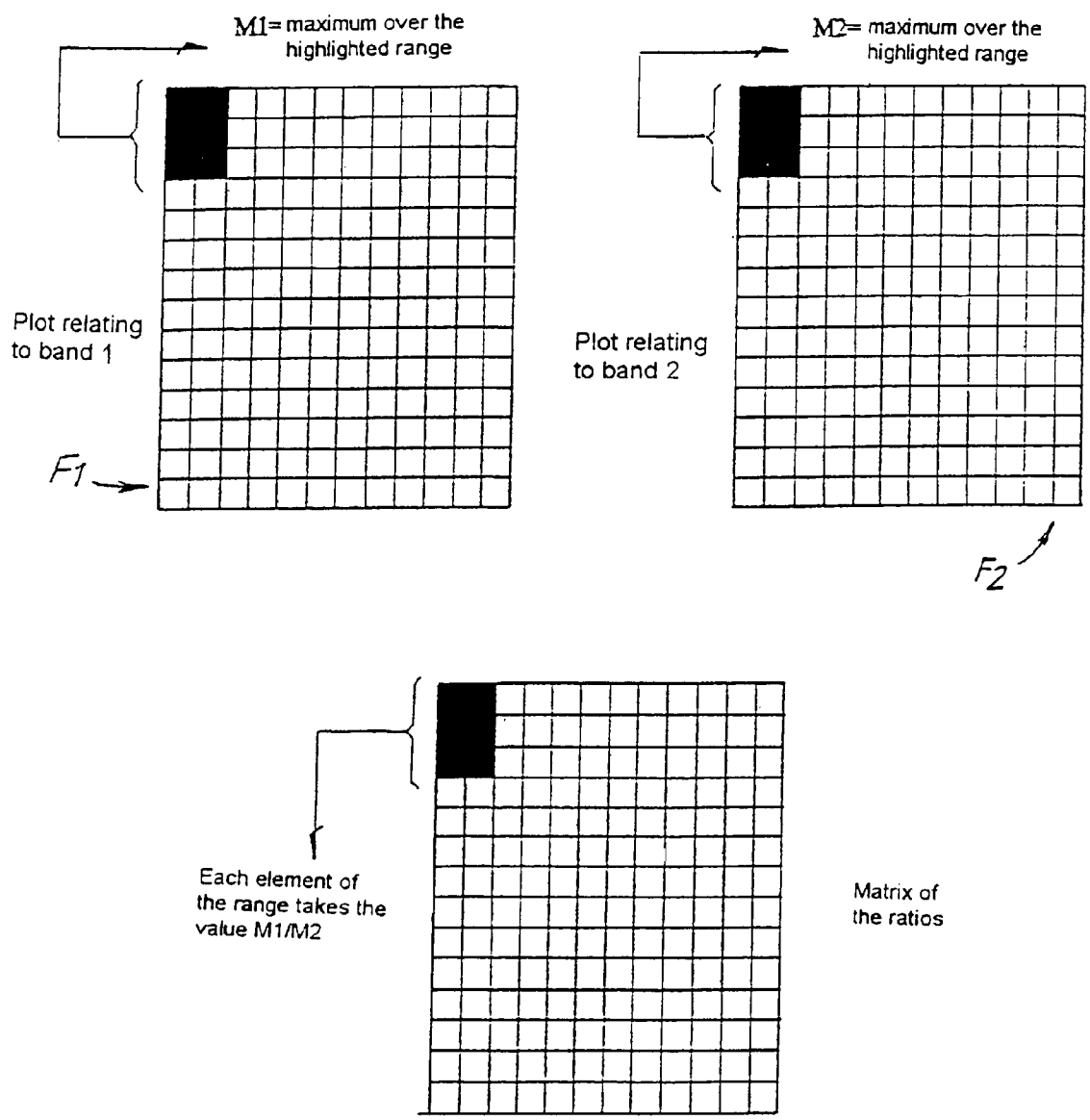
FIG. 23 shows schematically a different implementation of the method according to the invention.

An implementation of this type is described below with reference to FIG. 23. F1 and F2 show schematically two frames of the transform, obtained by encoding the digitized and sampled RF signal into frequency bands by the DWP transform. In practice, the frame F1 contains the coefficients of the frequency bands from 5 to 7.5 MHz, while the frame F2 contains the coefficients of the frequency bands from 7.5 to 10 MHz. A window is moved over the two frames F1 and F2, this window being represented by the black square in FIG. 23 superimposed on the two frames. For each step, in other words for each position of the window, the maximum value M1 taken by the coefficients in the window on the frame F1 is determined. Similarly, for each position or step of the window on the frame F2, the maximum value M2 taken by the coefficients lying within the window is determined. The values M1 and M2 determined for each position of the window can form two intermediate frames. The first intermediate frame will consist of coefficients $M1_{ij}$, while the second intermediate frame will be formed from coefficients $M2_{ij}$. The ratios of the coefficients of the two intermediate frames are found, thus generating a frame of local spectral parameters, in which each coefficient is represented by the ratio M1/M2. The frame of local spectral parameters, indicated by F in FIG. 23, will therefore consist of coefficients Sij, given by:

$$S_{ij}=M1_{ij}/M2_{ij}$$

This spectral parameter frame can be processed further by comparing the values of the individual coefficients with minimum and maximum threshold values determined experimentally. The coefficients lying below the minimum value and above the minimum value are rejected, while the others are represented on a monitor in the form of a color scale as a function of the values of said coefficients, to create an image superimposed on the B-mode image.

It has been found that this procedure can reveal the presence of blood vessels in the organs under examination without making use of the Doppler effect.

One of the possibilities offered by the wavelet coefficient is the extraction of information on the phase of the signal. This is because the wavelet transform, by its nature, can identify even small discontinuities present in the signal, a mode in which there are generally small phase shifts due to a distribution of diffusers which make up the structure of a tissue. If the characteristics of these micro-distributions can be determined, it is possible to identify a tissue and distinguish between healthy tissue, in which there is a regular structure represented by a distribution of diffusers which may be periodic for example, and pathological tissue, in which this periodicity is disrupted. The use of the wavelet transform not only makes it possible to discriminate particular periodicities of diffusers related to the structure, but also provides the possibility of adaptation to the tissue under investigation, since different mother forms of wavelet can be chosen according to the tissue.

Therefore, by using the method according to the present invention, it is possible to envisage the extraction of a local spectral parameter which is a function of the phase variation of the echographic response signal for the tissues under examination in the various frequency bands into which the digitized frame has been decomposed.

Clearly, the drawing shows only one practical embodiment of the invention, which can be varied in its forms and arrangements without departure from the scope of the principle of the invention. The presence of any reference numbers in the attached claims has the sole purpose of facilitating reading with reference to the preceding text and the attached drawings, and does not limit the scope of protection of the claims.

What we claim is:

1. A method of ultrasonic echographic examination, the method comprising the steps of:
   transmitting an ultrasonic excitation signal into a structure;
   receiving a response signal from said structure;
   applying a time-frequency transform to said response signal to divide the response signal into a plurality of frequency bands and determine coefficients of the transformed response signal for each of said frequency bands;

analyzing a variation in said coefficients of said time-frequency transform in said frequency bands at each instant of time;
determining a parameter representing each said variation;
displaying said parameter of said variation at each instant of time.

2. A method in accordance with claim 1, wherein:
said coefficients represent an energy of the response signal.

3. A method in accordance with claim 1, further comprising:
fitting a polynomial function to said variation, said displaying of said parameter including displaying a parameter of said polynomial function.

4. A method in accordance with claim 3, wherein:
said polynomial function includes a second order;
a parameter of said second order is displayed.

5. A method in accordance with claim 4, wherein:
said coefficients represent an energy of the response signal.

6. Method of spectral analysis of a radio frequency ultrasonic signal reflected by a structure subjected to echographic examination, comprising the steps of:
 a) transmitting a plurality of ultrasonic excitation signals into a portion of said structure subjected to examination;
 b) receiving a plurality of radio frequency response signals from said structure, each of said radio frequency response signals corresponding to a separate one of said ultrasonic excitation signals, said each radio frequency response signal being a track;
 c) forming said tracks into a frame;
 d) sampling and digitizing each track of said frame, to generate a digitized frame including a plurality of radio frequency tracks, each track including a set of digitized samples;
 e) applying a time-frequency transform to said digitized frame and encoding said digitized frame into a plurality of frequency bands, generating a transform frame in each frequency band, each transform frame including a plurality of transform coefficients of said time-frequency transform;
 f) analyzing a variation of said transform coefficients in said transform frames at a plurality of time points; and
 g) extracting local spectral parameters from the variation of said transform coefficients in said frequency bands in which said signal has been encoded for each of said plurality of time points;
 h) generating a spectral parameter frame with said spectral parameters.

7. Method according to claim 6, in which said time-frequency transform is a wavelet transform.

8. Method according to claim 7, in which said time-frequency transform is a discrete wavelet packet transform (DWPT).

9. Method according to claim 6, in which the radio frequency response signal from said structure is sampled and digitized, and the sampled and digitized signal is encoded into frequency bands.

10. Method according to claim 6, comprising the steps of:
selecting at least three frequency bands into which said response signal has been divided;
extracting said local spectral parameter from the coefficients of said at least three frequency bands.

11. Method according to claim 6, comprising the steps of:
acquiring an input frame, consisting of a plurality of tracks, each track consisting of the radio frequency signal received from the transducer after the generation of an excitation pulse;
sampling and digitizing each track of said frame, thus generating a digitized frame consisting of a plurality of radio frequency tracks, each containing a set of digitized samples;
applying said time-frequency transform to the digitized frame, thus encoding said digitized frame into a plurality of frequency bands, generating one frame of the transform in each band;
generating from the coefficients of at least three of said frames of the transform a frame of local spectral parameters, in which each coefficient is obtained by processing the coefficients of said at least three frames of the transform.

12. Method according to claim 11, in which the coefficients of each of said at least three frames of the transform are additionally processed to obtain at least three intermediate frames, and in which the coefficients of the frame of local spectral parameters are obtained by processing the coefficients of said intermediate frames.

13. Method according to claim 12, comprising the step of determining the statistical distribution of the local spectral parameters and creating a population frame, whose coefficients are indicative of the statistical distribution of said local parameters in one or more reference classes.

14. Method according to claim 12, in which an energy content frame is generated from each of said frames of the transform, said energy content frames constituting the intermediate frames.

15. Method according to claim 6, comprising the steps of:
acquiring an input frame, consisting of a plurality of radio frequency tracks, each track consisting of the response signal corresponding to an excitation signal;
sampling and digitizing each track of said frame, thus generating a digitized frame consisting of a plurality of radio frequency tracks, each containing a set of digitized samples;
applying said time-frequency transform to the digitized frame, thus encoding said digitized frame into a plurality of frequency bands, generating one frame of the transform in each band;
calculating the energy content of the signal for each track of the frame of the transform in each band, thus defining an energy content frame, said energy content frame having a set of samples representing the energy content of the input signal for each track and in each band;
interpolating for each track of the energy content frame, with an interpolating polynomial above the second degree, the samples of all the bands for each instant of time, one of the coefficients of said interpolating polynomial representing said local spectral parameter, and generating a frame of the spectral parameters containing the values of said coefficient for each coefficient of the energy content frame.

16. Method according to claim 15, in which said interpolating polynomial is a fourth-degree polynomial.

17. Method according to claim 15, in which said coefficient of the interpolating polynomial is the third-order coefficient.

18. Method according to claim 15, in which the statistical distribution of the coefficients of the spectral parameter frame in one or more classes of values is determined.

19. Method according to claim 6, wherein:
said local spectral parameter is a coefficient of a second-order or higher polynomial function approximating the local spectrum variation.

20. A method of spectral analysis of a radio frequency ultrasonic signal reflected by a structure subjected to echographic examination, the method comprising the steps of:

a) transmitting an ultrasonic excitation signal into a portion of said structure subjected to examination;
b) receiving a radio frequency response signal from said structure;
c) dividing the radio frequency response signal into a plurality of frequency bands with each frequency band having coefficients representing the response signal in the respective frequency band;
d) analyzing said coefficients at a plurality of time points, at each said time point:
   analyzing a variation in said coefficients at said time point across said plurality of frequency bands,
   determining a variation parameter representing said variation at said time point;
e) arranging said variation parameter from all of said time points into a parameter frame;
f) displaying said parameter frame.

21. A method in accordance with claim 20, wherein:
said determining of said variation parameter includes fitting a polynomial function to said variation, with said variation parameter being a coefficient of said polynomial function.

22. Echography device comprising an echography probe and means of acquiring and processing a radio frequency return signal from a structure subjected to echographic examination, characterized in that said acquisition and processing means are programmed to implement a method comprising the steps of:

a) transmitting a plurality of ultrasonic excitation signals into a portion of said structure subjected to examination;
b) receiving a plurality of radio frequency response signals from said structure, each of said radio frequency response signals corresponding to a separate one of said ultrasonic excitation signals, and each radio frequency response signal being a track;
c) forming said tracks into a frame;
d) sampling and digitizing each track of said frame, to generate a digitized frame including a plurality of radio frequency tracks, each track including a set of digitized samples;
e) applying a time-frequency transform to said digitized frame and encoding said digitized frame into a plurality of frequency bands, generating a transform frame in each frequency band, each transform frame including a plurality of transform coefficients of said time-frequency transform;
f) analyzing a variation of said transform coefficients in said transform frames at a plurality of time points; and
g) extracting local spectral parameters from the variation of said transform coefficients in said frequency bands in which said signal has been encoded for each of said plurality of time points;
h) generating a spectral parameter frame with said spectral parameters.

* * * * *